(12) United States Patent
Hayashi et al.

(10) Patent No.: US 12,437,578 B2
(45) Date of Patent: Oct. 7, 2025

(54) IMAGE DATA PROCESSING DEVICE AND SYSTEM

(71) Applicant: FUJIFILM Corporation, Tokyo (JP)

(72) Inventors: Daisuke Hayashi, Saitama (JP); Shunta Ego, Saitama (JP); Masahiro Terada, Saitama (JP); Kenji Makino, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 490 days.

(21) Appl. No.: 18/062,585

(22) Filed: Dec. 7, 2022

(65) Prior Publication Data
US 2023/0094896 A1 Mar. 30, 2023

Related U.S. Application Data

(63) Continuation of application No. PCT/JP2021/024052, filed on Jun. 25, 2021.

(30) Foreign Application Priority Data

Jul. 1, 2020 (JP) ................................. 2020-114005

(51) Int. Cl.
*G06T 7/00* (2017.01)
*G06T 7/70* (2017.01)
(Continued)

(52) U.S. Cl.
CPC .............. *G06V 40/161* (2022.01); *G06T 7/70* (2017.01); *G06V 10/761* (2022.01);
(Continued)

(58) Field of Classification Search
CPC .. G06V 40/161; G06V 10/761; G06V 10/762; G06V 40/174; G06V 40/16;
(Continued)

(56) References Cited

U.S. PATENT DOCUMENTS

| 2004/0179719 A1* | 9/2004 | Chen ..................... G06F 18/214 |
| | | 382/118 |
| 2006/0008145 A1* | 1/2006 | Kaku ................... G06V 40/161 |
| | | 382/173 |

(Continued)

FOREIGN PATENT DOCUMENTS

| JP | 2011141799 | 7/2011 |
| JP | 2013117933 | 6/2013 |

(Continued)

OTHER PUBLICATIONS

"International Search Report (Form PCT/ISA/210) of PCT/JP2021/024052", mailed on Aug. 24, 2021, with English translation thereof, pp. 1-5.

(Continued)

*Primary Examiner* — Van D Huynh
(74) *Attorney, Agent, or Firm* — JCIPRNET

(57) ABSTRACT

An image data processing device and a system capable of efficiently detecting a face from an image including a plurality of faces are provided. A processor executes at least following processes including detecting a face of a person from an image represented by image data by using a first discrimination model and discriminating an attribute of the detected face, clustering an area where the face is detected in the image represented by the image data according to a type of the attribute of the face, selecting a second discrimination model to be applied to the area based on information on the type of the attribute of the face in the clustered area, and detecting a face of a person from an image of each area by using the second discrimination model applied to the area and discriminating an attribute of the detected face.

18 Claims, 25 Drawing Sheets

(51) Int. Cl.
    *G06V 10/74* (2022.01)
    *G06V 10/762* (2022.01)
    *G06V 40/16* (2022.01)
(52) U.S. Cl.
    CPC .......... *G06V 10/762* (2022.01); *G06V 40/174* (2022.01); *G06T 2207/30201* (2013.01)
(58) Field of Classification Search
    CPC ............. G06T 7/70; G06T 2207/30201; G06T 2207/20084
    See application file for complete search history.

(56) References Cited

U.S. PATENT DOCUMENTS

| | | | | |
|---|---|---|---|---|
| 2010/0014758 | A1* | 1/2010 | Yano | G06V 10/809 382/118 |
| 2010/0021066 | A1* | 1/2010 | Sabe | G06V 10/768 382/190 |
| 2010/0207874 | A1 | 8/2010 | Yuxin et al. | |
| 2013/0142401 | A1 | 6/2013 | Nomoto et al. | |
| 2013/0301885 | A1* | 11/2013 | Mori | G06V 40/174 382/118 |
| 2016/0267339 | A1* | 9/2016 | Nakano | G06T 11/00 |
| 2020/0104637 | A1* | 4/2020 | Kim | A61B 5/4088 |
| 2021/0319226 | A1* | 10/2021 | Debnath | G06F 18/23 |
| 2022/0245961 | A1* | 8/2022 | Yan | G06V 40/172 |

FOREIGN PATENT DOCUMENTS

| | | |
|---|---|---|
| JP | 2017188715 | 10/2017 |
| JP | 2018045350 | 3/2018 |
| JP | 2018142061 | 9/2018 |
| JP | 2019219987 | 12/2019 |

OTHER PUBLICATIONS

"Written Opinion of the International Searching Authority (Form PCT/ISA/237) of PCT/JP2021/024052," mailed on Aug. 24, 2021, with English translation thereof, pp. 1-6.

* cited by examiner

FIG. 11

| FACE ORIENTATION | FACE INFORMATION | | |
|---|---|---|---|
| | LAUGHING | ANGRY | EXPRESSIONLESS |
| FRONT | FRONT × LAUGHING LABEL: A1 | FRONT × ANGRY LABEL: B1 | FRONT × EXPRESSIONLESS LABEL: C1 |
| RIGHT SIDEWAYS | RIGHT SIDEWAYS × LAUGHING LABEL: A2 | RIGHT SIDEWAYS × ANGRY LABEL: B2 | RIGHT SIDEWAYS × EXPRESSIONLESS LABEL: C2 |
| LEFT SIDEWAYS | LEFT SIDEWAYS × LAUGHING LABEL: A3 | LEFT SIDEWAYS × ANGRY LABEL: B3 | LEFT SIDEWAYS × EXPRESSIONLESS LABEL: C3 |
| SELECTED SECOND DISCRIMINATION MODEL | SECOND DISCRIMINATION MODEL FOR LAUGHING EXPRESSION | SECOND DISCRIMINATION MODEL FOR ANGRY EXPRESSION | SECOND DISCRIMINATION MODEL FOR NO EXPRESSION |

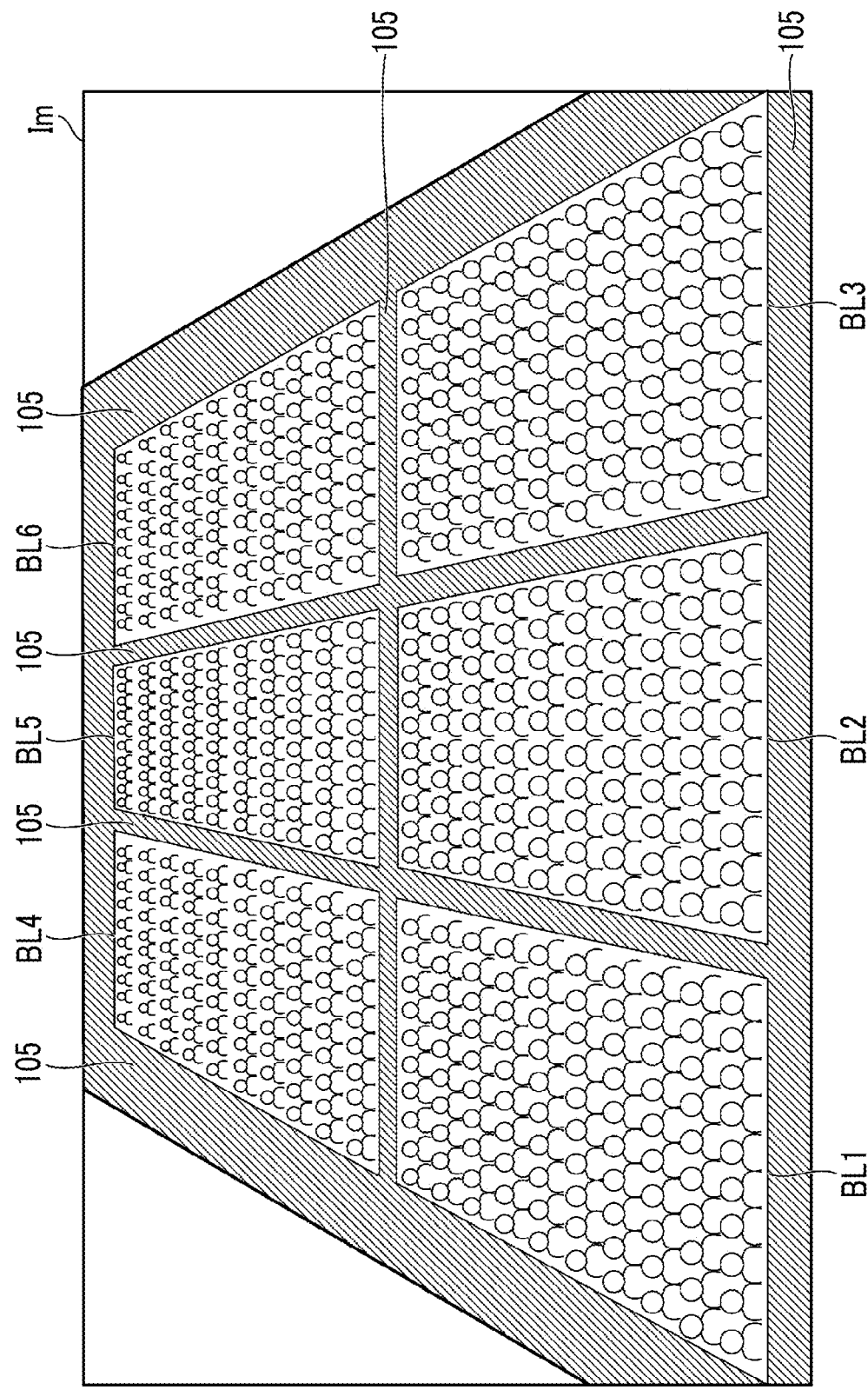

IMAGE DATA PROCESSING DEVICE AND SYSTEM

CROSS-REFERENCE TO RELATED APPLICATIONS

The present application is a Continuation of PCT International Application No. PCT/JP2021/024052 filed on Jun. 25, 2021 claiming priority under 35 U.S.C. § 119(a) to Japanese Patent Application No. 2020-114005 filed on Jul. 1, 2020. Each of the above applications is hereby expressly incorporated by reference, in its entirety, into the present application.

BACKGROUND OF THE INVENTION

1. Field of the Invention

The present invention relates to an image data processing device and a system, and particularly relates to an image data processing device and a system for processing image data of an image including a plurality of faces.

2. Description of the Related Art

JP2019-219987A discloses a technique of detecting a face of a person included in an image and discriminating an expression or the like of the detected face to estimate a state of the person of each face.

JP2011-141799A discloses a technique of discriminating gender simultaneously with face detection by using two identifiers, one for detecting a male face and the other for detecting a female face.

JP2018-142061A discloses a technique of separating a region with motion and a region without motion by applying motion analysis to an image and detecting a face under different conditions for each separated region.

JP2018-45350A discloses a technique of identifying an expression of a face of a specific user by using an identification model, in which an expression tendency of an expression of a face of a user as an identification target is determined, and an identification model used for identification is selected based on the determination result.

SUMMARY OF THE INVENTION

One embodiment according to a technique of the present disclosure provides an image data processing device and a system capable of efficiently detecting a face from an image including a plurality of faces.

(1) An image data processing device that processes image data, the device comprising: a memory; and a processor, in which the processor executes a first discrimination process of detecting a face of a person from an image represented by the image data by using a first discrimination model and discriminating an attribute of the detected face, a clustering process of clustering an area where the face is detected in the image represented by the image data according to a type of the attribute of the face, a selection process of selecting a second discrimination model to be applied to the area based on information on the type of the attribute of the face in the clustered area, and a second discrimination process of detecting a face of a person from an image of the area by using the second discrimination model applied to the area and discriminating an attribute of the detected face.

(2) The image data processing device according to (1), in which the second discrimination model is prepared for each type of attributes of a plurality of faces, and in the clustering process, the clustering is performed according to the type of the attribute of the face for which the second discrimination model is prepared.

(3) The image data processing device according to (2), in which the second discrimination model is prepared according to a type of the attribute of the face discriminated by the first discrimination model.

(4) The image data processing device according to (2) or (3), in which the second discrimination model detects the face of a corresponding type of the attribute with a higher accuracy than the first discrimination model.

(5) The image data processing device according to any one of (1) to (4), in which the second discrimination model classifies the types in more detail within a range of a corresponding type of the attribute to discriminate the attribute of the face.

(6) The image data processing device according to any one of (1) to (4), in which the second discrimination model classifies whether or not the face has a corresponding type of the attribute to discriminate the attribute of the face.

(7) The image data processing device according to any one of (1) to (6), in which the processor executes each process once in order of the first discrimination process, the clustering process, the selection process, and the second discrimination process.

(8) The image data processing device according to any one of (1) to (6), in which the processor executes each process once in order of the first discrimination process, the clustering process, the selection process, and the second discrimination process, and then repeatedly executes the clustering process, the selection process, and the second discrimination process based on a result of the second discrimination process.

(9) The image data processing device according to any one of (1) to (8), in which the first discrimination model and the second discrimination model discriminates at least an expression as the attribute of the face.

(10) The image data processing device according to (9), in which the first discrimination model and/or the second discrimination model further discriminates an orientation of the face as the attribute of the face.

(11) The image data processing device according to any one of (1) to (10), in which the processor further executes an extraction process of extracting an area where a person exists from the image represented by the image data as a processing target area, and executes the clustering process, the selection process, and the second discrimination process to the extracted processing target area.

(12) The image data processing device according to (11), in which, in the extraction process, a passage is detected from the image, and an area divided by the passage is extracted as the processing target area.

(13) The image data processing device according to any one of (1) to (12), in which the processor further executes a map data generation process of generating map data in which the face detected from the image represented by the image data is recorded by associating a position of the face in the image with the attribute.

(14) The image data processing device according to (13), in which the processor further executes a heat map generation process of generating a heat map based on the map data.

(15) The image data processing device according to (14), in which the processor further executes a display control process of displaying the generated heat map on a display.

(16) The image data processing device according to (14) or (15), in which the processor further executes an output control process of outputting the generated heat map to an outside.

(17) The image data processing device according to any one of (1) to (16), in which the first discrimination model and the second discrimination model are stored in the memory.

(18) An image data processing system comprising: an imaging device; and the image data processing device according to any one of (1) to (17), which inputs and processes image data captured by the imaging device.

BRIEF DESCRIPTION OF THE DRAWINGS

FIG. 11 is a diagram showing an example of a relationship between an attribute of a face discriminated by a first discrimination model and a type of a second discrimination model.

FIG. 25 is a conceptual diagram of extraction of the processing target area.

DESCRIPTION OF THE PREFERRED EMBODIMENTS

Hereinafter, preferred embodiments of the present invention will be described with reference to the accompanying drawings.

First Embodiment

In events such as concerts, plays, and sports, by measuring and collecting emotions of visitors throughout the entire time during the event, a variety of information about the event can be analyzed. For example, in concerts or the like, it is possible to analyze a degree of excitement for each song from collected information. In addition, by recording information on emotions of each visitor in association with information on a position in a venue, distribution of a state of excitement in the venue can be analyzed. Furthermore, by specifying the center of the excitement from information on the distribution of the excitement, a visitor who plays a role of the excitement can be specified.

The emotions are measured based on an image obtained by capturing an inside of the venue. Specifically, the emotions of each visitor are specified by detecting faces of the visitors from the image obtained by capturing the inside of the venue and discriminating expressions thereof.

In recent years, improvement in performance of a camera has made it possible to capture hundreds or thousands of visitors at one time with high resolution.

On the other hand, in order to detect each face from an image including a large number of faces and discriminate an expression thereof, a lot of computational resources are required. Therefore, there is a problem that a sufficient detection speed cannot be obtained.

In the present embodiment, an image data processing device capable of efficiently detecting a face and discriminating an expression thereof even in an image including a large number of faces will be described. The expression is an example of an attribute of the face.

[Device Configuration]

Figure 1:
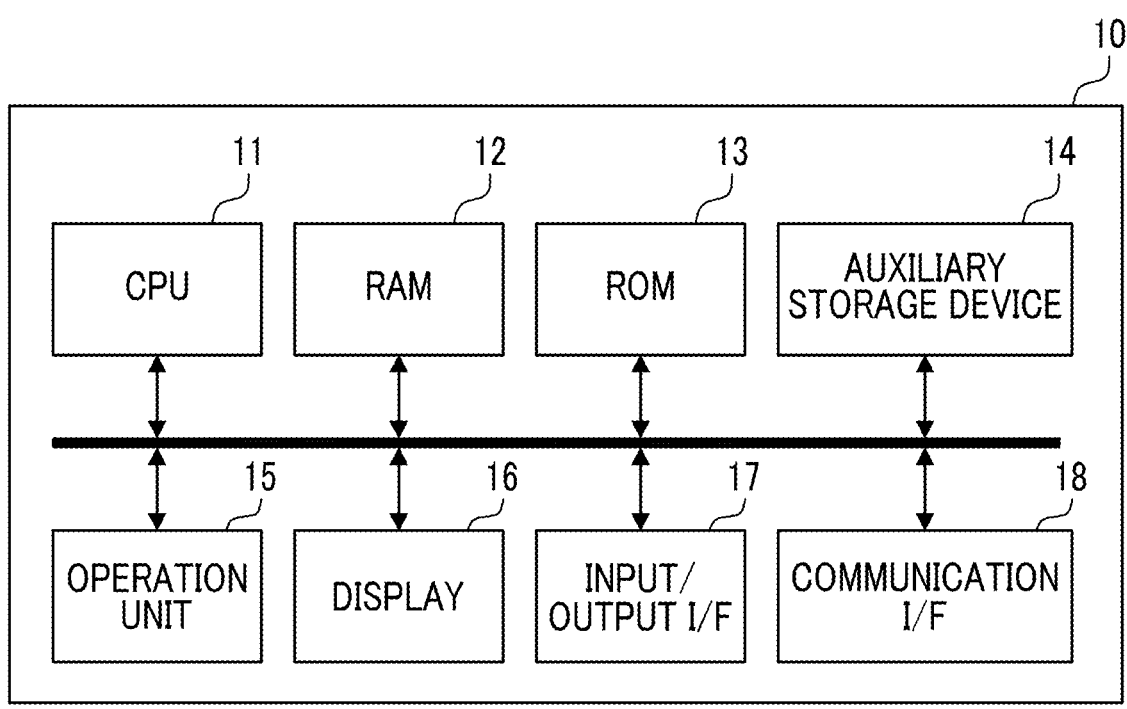
FIG. 1 is a block diagram showing an example of a hardware configuration of an image data processing device.

FIG. 1 is a block diagram showing an example of a hardware configuration of the image data processing device.

As shown in FIG. 1, the image data processing device 10 comprises a central processing unit (CPU) 11, a random access memory (RAM) 12, a read only memory (ROM) 13, an auxiliary storage device 14, an operation unit 15, a display 16, an input/output interface (I/F) 17, and a communication interface 18. That is, the image data processing device 10 is constituted by a computer, and the computer functions as the image data processing device 10 by executing a predetermined program. For example, a general-purpose computer such as a personal computer can be used as the computer constituting the image data processing device 10. The CPU 11 is an example of a processor. The ROM 13 and/or the auxiliary storage device 14 stores a program executed by the CPU 11 and various kinds of data. The ROM 13 and/or the auxiliary storage device 14 is an example of a memory. As the auxiliary storage device 14, a hard disk drive (HDD), a flash memory, a solid state disk (SSD), or the like is adopted. The operation unit 15 is composed of, for example, a keyboard, a mouse, or a touch panel. The display 16 is composed of, for example, a liquid crystal display (LCD) or organic EL display (organic light emitting diode display (OLED display)).

Figure 2:
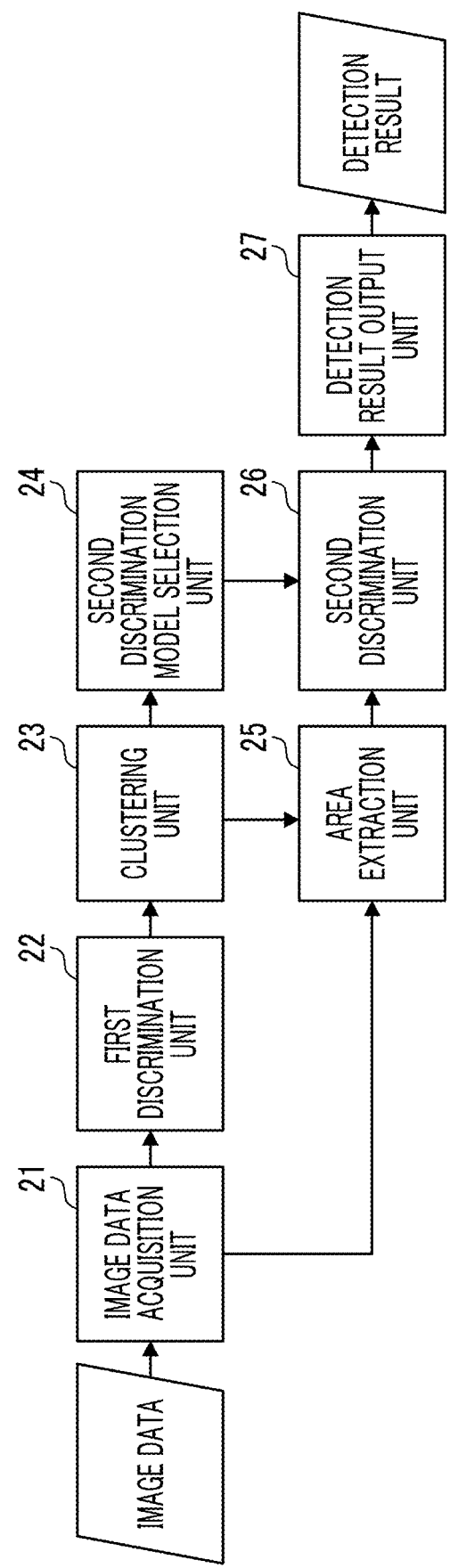
FIG. 2 is a block diagram of a main function of the image data processing device.

FIG. 2 is a block diagram of a main function of the image data processing device.

As shown in FIG. 2, the image data processing device 10 mainly has functions of an image data acquisition unit 21, a first discrimination unit 22, a clustering unit 23, a second discrimination model selection unit 24, an area extraction unit 25, a second discrimination unit 26, and a detection result output unit 27. The functions of the respective units are realized by the CPU 11, which is a processor, executing a predetermined program (image data processing program).

The image data acquisition unit 21 acquires image data to be processed. The image data is input to the image data processing device 10 via the input/output interface 17 or the communication interface 18.

The first discrimination unit 22 detects a face of a person from an image represented by the image data acquired by the image data acquisition unit 21, and discriminates and outputs an expression of the detected face of the person. Therefore, the image data input to the first discrimination unit 22 is the image data acquired by the image data acquisition unit 21. The face is detected by specifying a position thereof in the image. Therefore, information on the position and expression of the detected face is output from the first discrimination unit 22.

The position of the face in the image is specified, for example, by a bounding box. The bounding box is a rectangular frame that surrounds the detected face. The position of the bounding box is specified, for example, by center coordinates of the bounding box.

As for the expression, one is specified from among a plurality of predetermined types of expressions. That is, the first discrimination unit 22 classifies and outputs the expressions the face of each person from a plurality of predetermined types of expressions. In the present embodiment, the expressions of the face of each person are classified and output from three types of expressions of "laughing", "angry", and "expressionless".

The first discrimination unit 22 performs a process (first discrimination process) of detecting a face of each person from the image using a first discrimination model, which is a trained model, and discriminating an expression of the detected face of each person. The first discrimination model is generated through machine learning using an image including a face as training data. As the first discrimination model, for example, a convolutional neural network (CNN) for detecting an object, such as regions with convolutional neural networks (R-CNN), fast regions with convolutional neural networks (fast R-CNN), faster regions with convolutional neural networks (faster R-CNN), mask regions with convolutional neural networks (mask R-CNN), a single shot multibox detector (SSD), you only look once (YOLO), you only look once version2 (YOLOv2), and you only look once version3 (YOLOv3), can be used. The first discrimination model is stored in the ROM 13 or the auxiliary storage device 14 as a memory.

Generally, in expression recognition using a trained model, the certainty (facial expression score) of each expression is output as a recognition result. The certainty of each expression is output such that the total is 1. Therefore, the expression of the detected face can be specified by specifying an expression with the highest certainty. For example, in a case where there are three types of expressions of the face to be discriminated, that is, "laughing", "angry", and "expressionless", and the certainty of each expression is laughing: 0.98, angry: 0.01, and expressionless: 0.01, the expression of the face is specified as "laughing".

Figure 3:
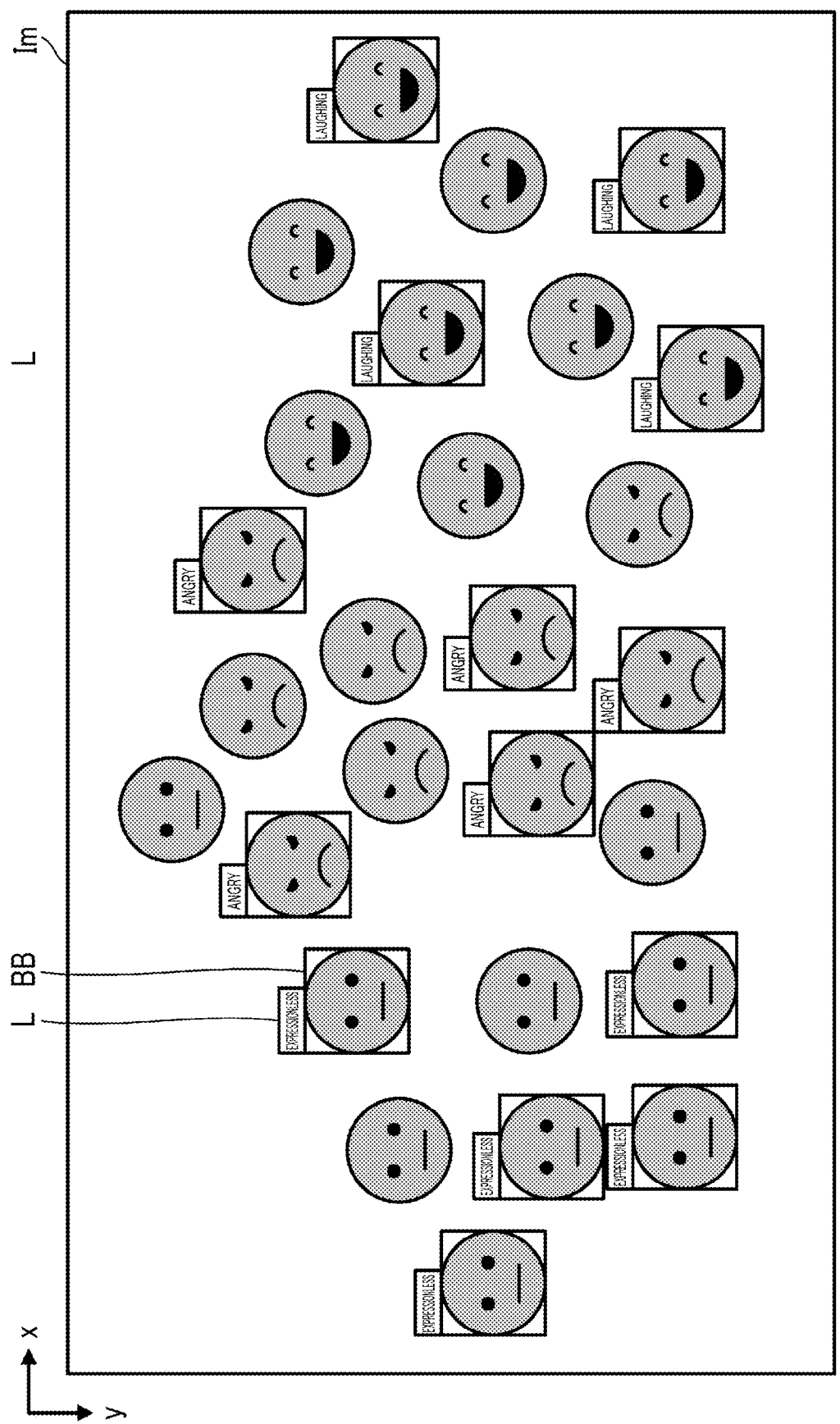
FIG. 3 is a diagram showing an example of a detection result of a face by a first discrimination unit.

FIG. 3 is a diagram showing an example of a detection result of the face by the first discrimination unit.

In the example shown in FIG. 3, a face detected from an image Im is surrounded by a bounding box BB. Therefore, the face not surrounded by the bounding box BB is a face that cannot be detected by the first discrimination unit 22.

In FIG. 3, a label L attached to each bounding box BB represents a type of an expression discriminated for the detected face.

The clustering unit 23 performs a process (clustering process) of clustering an area where a face is detected in the image represented by the image data. In the present embodiment, the area where the face is detected is clustered according to a type of a second discrimination model used by the second discrimination unit 26. For example, in a case where the second discrimination model is prepared for each type of the expression of the face discriminated by the first discrimination unit 22, clustering is performed according to the type of the expression of the face discriminated by the first discrimination unit 22. In the image data processing device 10 of the present embodiment, it is assumed that the second discrimination model is prepared for each type of the expression of the face discriminated by the first discrimination unit 22. Therefore, in the image data processing device 10 of the present embodiment, clustering is performed according to the type of the expression of the face discriminated by the first discrimination unit 22. As described above, the first discrimination unit 22 discriminates three types of expressions of "laughing", "angry", and "expressionless". Therefore, the clustering unit 23 performs clustering for each of three types of expressions of "laughing", "angry", and "expressionless".

Figure 4:
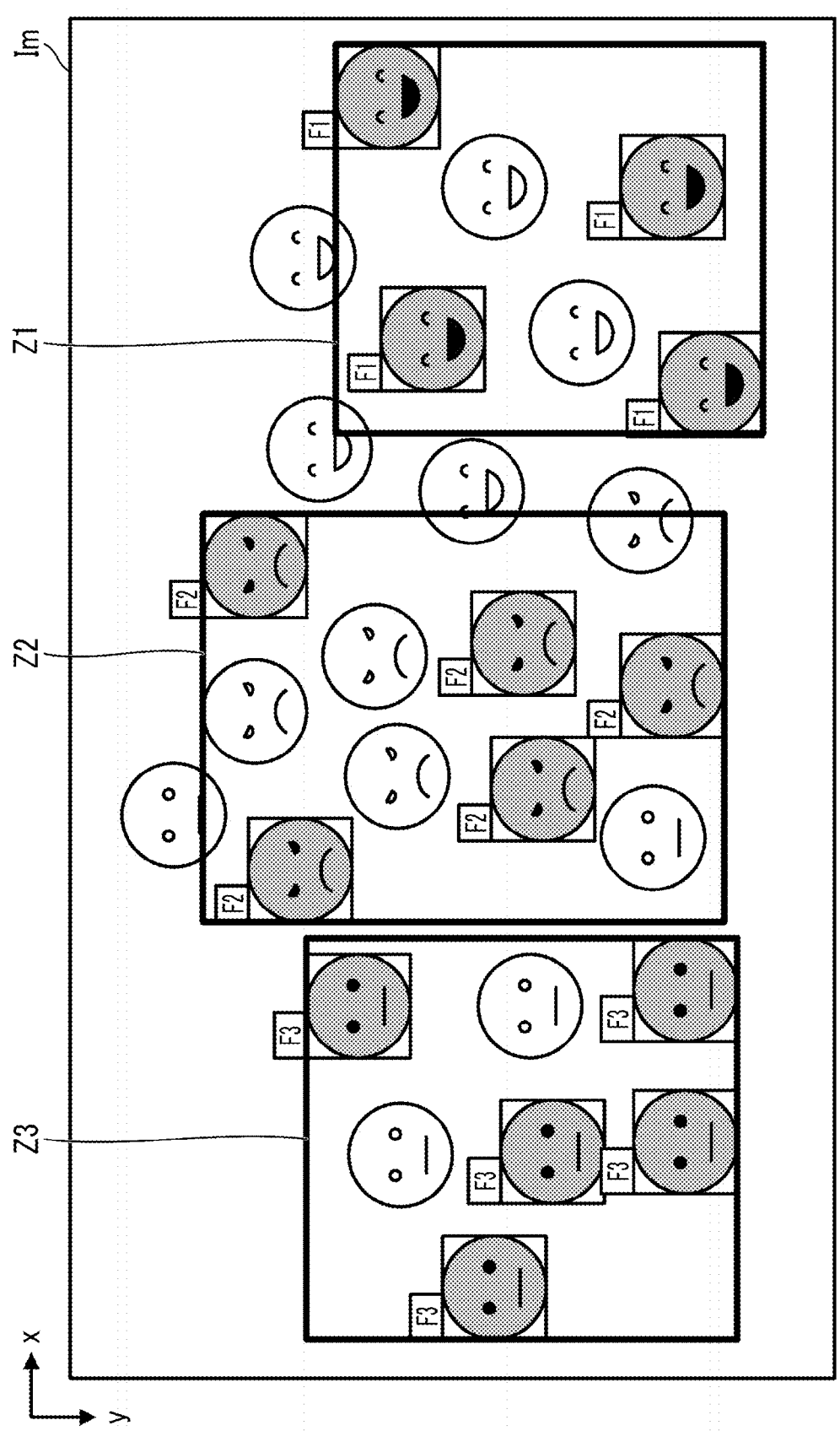
FIG. 4 is a conceptual diagram of a clustering process.

FIG. 4 is a conceptual diagram of the clustering process.

First, the faces detected from the image are clustered according to the type of the second discrimination model. In the present embodiment, since the second discrimination model is prepared for each type of the expression of the face discriminated by the first discrimination unit 22, clustering is performed according to the type of the expression of the face discriminated by the first discrimination unit 22. In FIG. 4, a face surrounded by a rectangular frame indicates a face detected by the first discrimination unit 22. In addition, a label attached to each frame indicates a type of the classified cluster. A label F1 is a label attached to a face classified into a cluster of laughing expressions. A label F2 is a label attached to a face classified into a cluster of angry expressions. A label F3 is a label attached to a face classified into a cluster of no expressions.

A known method is adopted for the clustering. For example, the clustering is performed using a clustering algorithm such as a k-means clustering.

After the clustering, an area for each cluster is set. Each area is set as an area including all faces belonging to each cluster. For example, a minimum rectangular frame including all faces belonging to each cluster is obtained and set. This frame is obtained as a rectangular frame circumscribing the face located on the outermost side in the horizontal direction (x direction in FIG. 4) and the vertical direction (y direction in FIG. 4) of the image. An area within the obtained rectangular frame is set as an area of faces belonging to each cluster. In FIG. 4, an area represented by a reference numeral Z1 is a laughing expression area. An area represented by a reference numeral Z2 is an angry expression area. An area represented by a reference numeral Z3 is an expressionless area.

As described above, the areas where the face is detected from the image are clustered according to the type of the second discrimination model. In the present embodiment, since the second discrimination model is prepared for each type of the expression of the face discriminated by the first discrimination unit 22, clustering is performed according to the type of the expression of the face discriminated by the first discrimination unit 22.

The second discrimination model selection unit 24 performs a process (selection process) of selecting a second discrimination model to be applied to each area based on information on the type of the expression of the face in each clustered area. The types of the expressions of the faces to be clustered match the types of the second discrimination model. Therefore, the second discrimination model corresponding to the type of the expression of the face in each area is selected. Therefore, for example, in FIG. 4, a second discrimination model with the laughing expression is selected for the laughing expression area Z1. In addition, a second discrimination model with the angry expression is selected for the angry expression area Z2. In addition, a second discrimination model with no expression is selected for the expressionless area Z3. Information on the second discrimination model selected for each area is added to the second discrimination unit 26.

Figure 5:
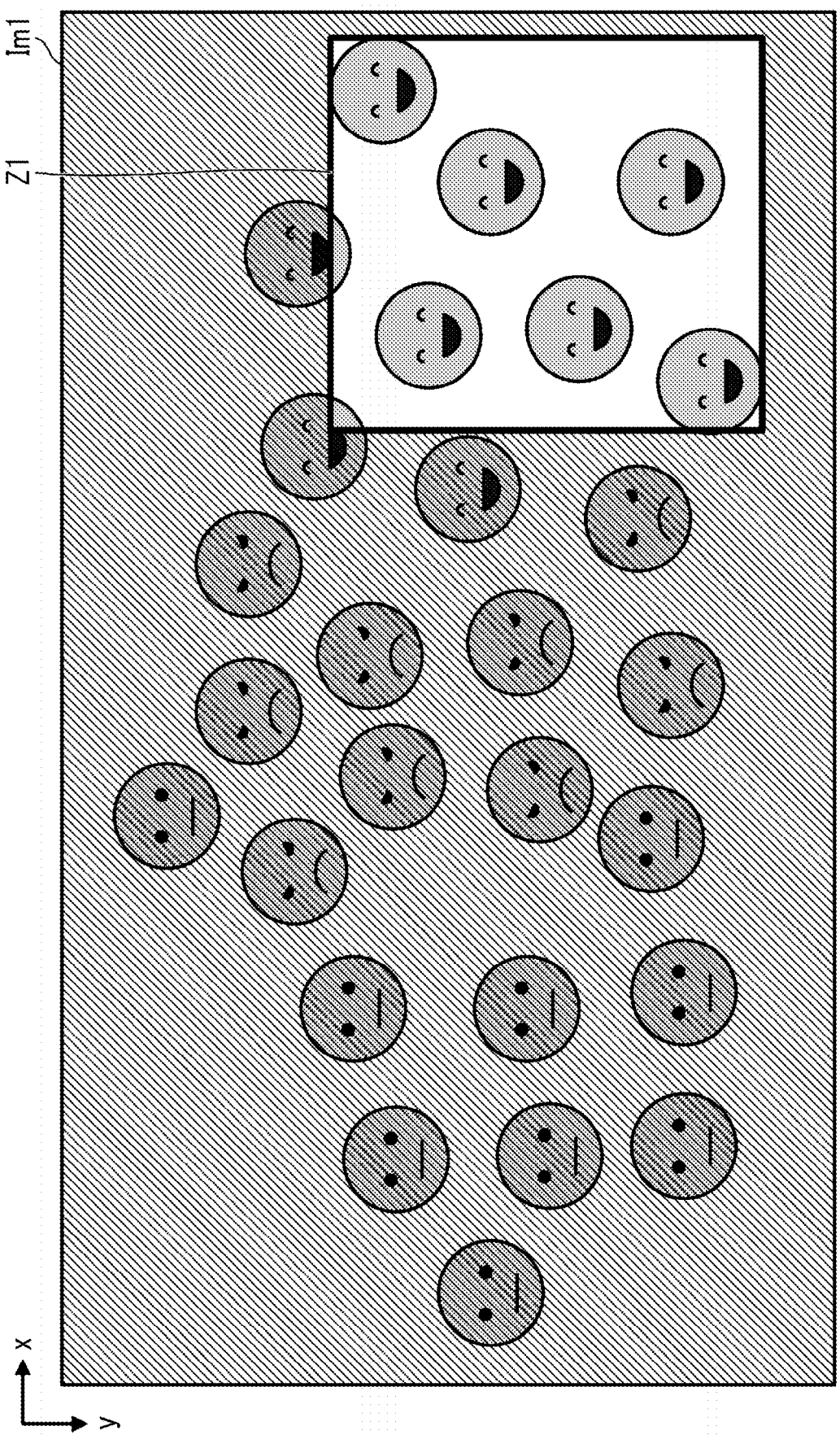
FIG. 5 is a conceptual diagram of area extraction.

The area extraction unit 25 performs a process of extracting an image of each area clustered from the image represented by the image data acquired by the image data acquisition unit 21. The area extraction unit 25 extracts an image of each area based on the information on each area clustered by the clustering unit 23. FIG. 5 is a conceptual diagram of area extraction. FIG. 5 shows an example of a case where the laughing expression area Z1 is extracted. As shown in FIG. 5, for the image of each area, an image in which other regions are masked is generated, and an image of each area is extracted. In FIG. 5, a region indicated by a diagonal line is a masked region. In a case of an image Im1 of the laughing expression area Z1, a region other than the area is masked. The area extraction unit 25 extracts images as many as the number of clustered areas. The extracted images of each area are added to the second discrimination unit 26.

The second discrimination unit 26 performs a process (second discrimination process) of detecting a face of a person from an image of each clustered area and discriminating and outputting an expression of the detected face of the person. Therefore, an image of each area extracted by the area extraction unit 25 is input to the second discrimination unit 26. The face is detected by specifying a position thereof in the image in the same manner as in the first discrimination unit 22. Therefore, the position and expression of the detected face are output from the second discrimination unit 26.

The second discrimination unit 26 performs a process of detecting a face of a person from the image using a plurality of second discrimination models of different types and discriminating an expression of the detected face of each person. Each second discrimination model is a trained model and is generated through machine learning using an image including a face as training data. For each second discrimination model, a CNN for detecting an object, such as R-CNN, fast R-CNN, faster R-CNN, mask R-CNN, SSD, YOLO, YOLOv2, and YOLOv3, is used.

A plurality of second discrimination models are prepared for each type of the expression of the face. In the present embodiment, a second discrimination model is prepared for each type of the expression of the face discriminated by the first discrimination unit 22. Therefore, a second discrimination model corresponding to a laughing expression (second discrimination model for laughing expression), a second discrimination model corresponding to an angry expression (second discrimination model for angry expression), and a second discrimination model corresponding to no expression (second discrimination model for no expression) are prepared.

Each second discrimination model is constituted by a discrimination model capable of detecting a face with a corresponding type of an expression with a higher accuracy than the first discrimination model. That is, the second discrimination model for a laughing expression is constituted by a discrimination model that detects a face with the laughing expression from the input image with a higher accuracy than the first discrimination model. In addition, the second discrimination model for an angry expression is constituted by a discrimination model that detects a face with the angry expression from the input image with a higher accuracy than the first discrimination model. In addition, the second discrimination model for no expression is constituted by a discrimination model that detects a face with no expression from the input image with a higher accuracy than the first discrimination model.

In each second discrimination model, a structure of the neural network is made more multilayered than that of the first discrimination model so that a face with a corresponding expression can be detected with a higher accuracy than the first discrimination model. Specifically, a structure of a hidden layer (interlayer) constituting the neural network is made more multilayered than that of the first discrimination model. In this way, by making the structure of the neural network more multilayered (deep network structure), the second discrimination model can detect a face with a corresponding type of an expression with a higher accuracy than the first discrimination model. On the other hand, the first discrimination model can achieve a higher detection processing speed than the second discrimination model. That is, in the image data processing device of the present embodiment, the first discrimination model and the second discrimination model have the following relationship. The first discrimination model is constituted by a discrimination model that is inferior in detection accuracy but excellent in detection processing speed. On the other hand, the second discrimination model is constituted by a discrimination model that is inferior in detection processing speed but excellent in detection accuracy. As a result, in the face detection using the first discrimination model, faces with each expression are automatically randomly sampled from an image. On the other hand, in the face detection using the second discrimination model, a face with a corresponding expression is detected from an image with a high accuracy.

The second discrimination model classifies whether or not the face has a corresponding type of the expression, and discriminates the expression of the detected face. For example, the second discrimination model for a laughing expression discriminates whether or not the expression of the detected face is a laughing expression (whether it is a laughing expression or a non-laughing expression). In addition, the second discrimination model for an angry expression discriminates whether or not the expression of the detected face is an angry expression (whether it is an angry expression or a non-angry expression). In addition, the second discrimination model for no expression discriminates whether or not the expression of the detected face is expressionless (whether it is expressionless or expression other than expressionlessness).

Figure 6:
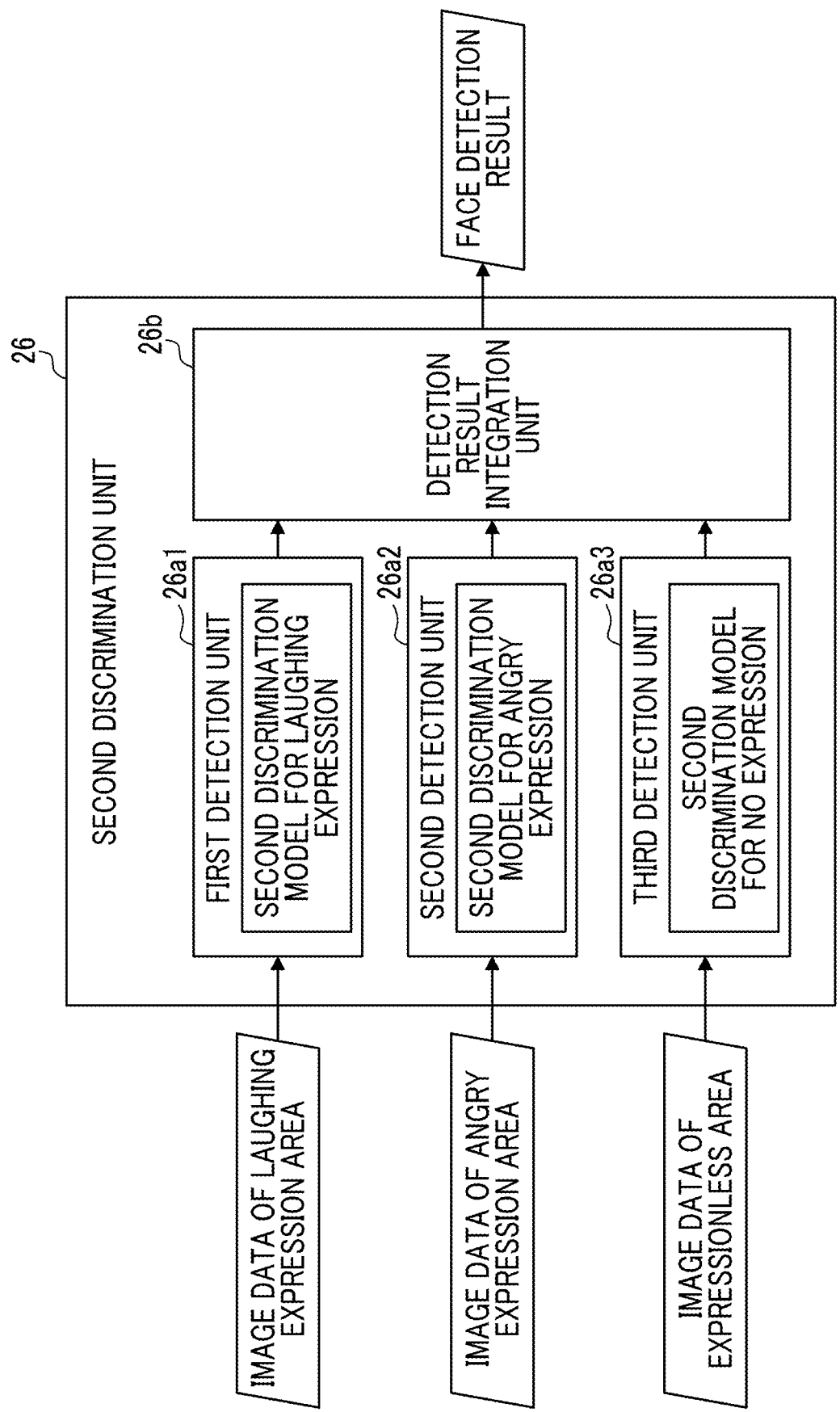
FIG. 6 is a functional block diagram of a second discrimination unit.

FIG. 6 is a functional block diagram of the second discrimination unit.

The second discrimination unit 26 mainly has functions of a first detection unit 26a1, a second detection unit 26a2, a third detection unit 26a3, and a detection result integration unit 26b.

The first detection unit 26a1 performs a process of detecting a face of a person from the input image and discriminating and outputting an expression of the detected face of the person by using the second discrimination model for a laughing expression. Therefore, image data of the laughing expression area (image data obtained by extracting an image of the laughing expression area) is input to the first detection unit 26a1. As described above, whether or not the expression is a laughing expression is discriminated and output.

Figure 7:
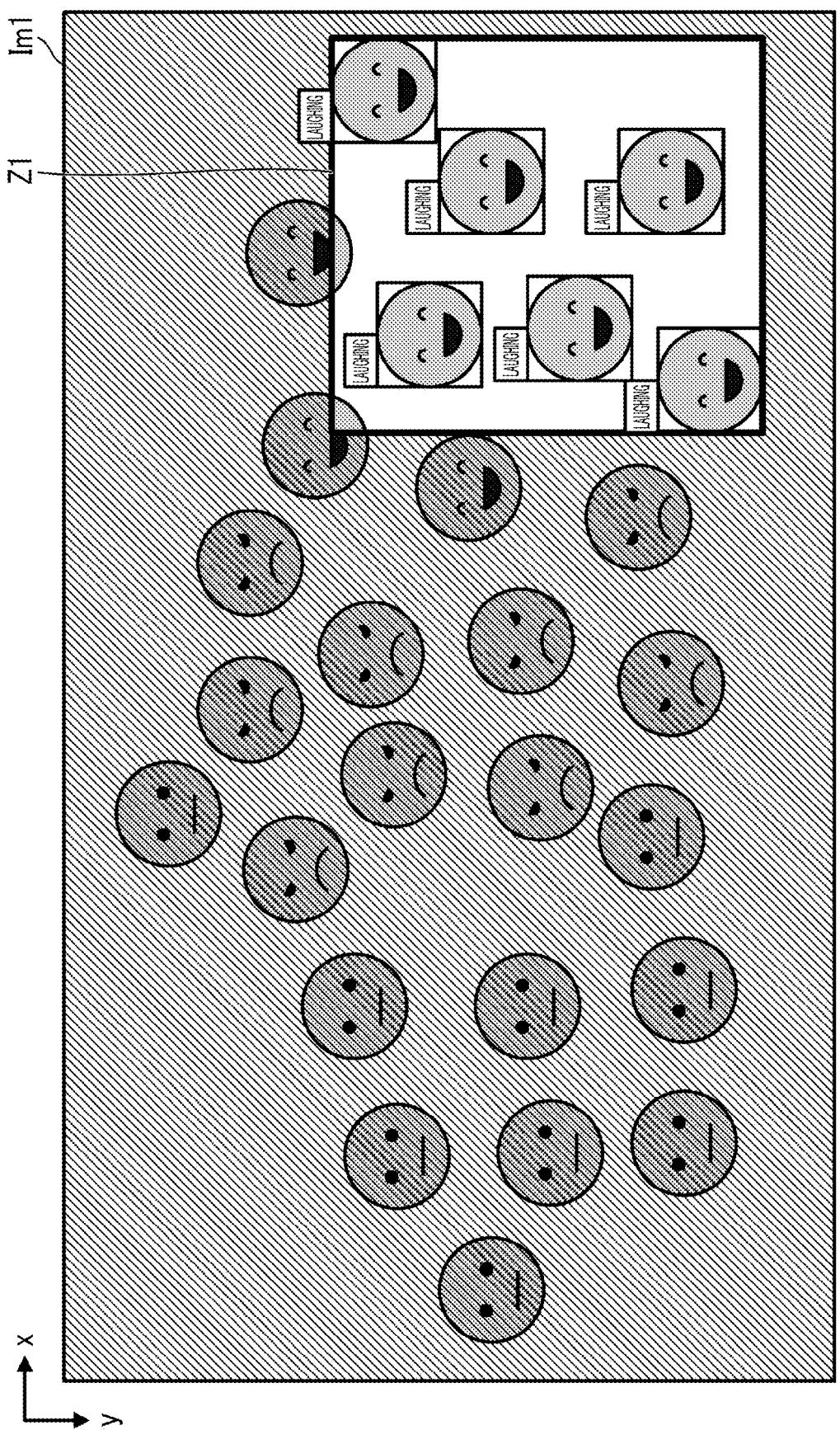
FIG. 7 is a diagram showing an example of a detection result of a face by a first detection unit.

FIG. 7 is a diagram showing an example of a detection result of the face by the first detection unit.

As shown in FIG. 7, a face is detected from an image of the laughing expression area Z1, and an expression thereof is discriminated. Since the second discrimination model can detect a face with a corresponding expression with a higher accuracy than the first discrimination model, it is possible to detect a face (see FIG. 3) that could not be detected by the first discrimination model.

The second detection unit 26a2 performs a process of detecting a face of a person from the input image and discriminating and outputting an expression of the detected face of the person by using the second discrimination model for an angry expression. Therefore, image data of the angry expression area (image data obtained by extracting an image of the angry expression area) is input to the second detection unit 26a2. As described above, whether or not the expression is an angry expression is discriminated and output.

The third detection unit 26a3 performs a process of detecting a face of a person from the input image and discriminating and outputting an expression of the detected face of the person by using the second discrimination model for no expression. Therefore, image data of the expressionless area (image data obtained by extracting an image of the expressionless area) is input to the third detection unit 26a3. As described above, whether or not the expression is expressionless is discriminated and output.

Figure 8:
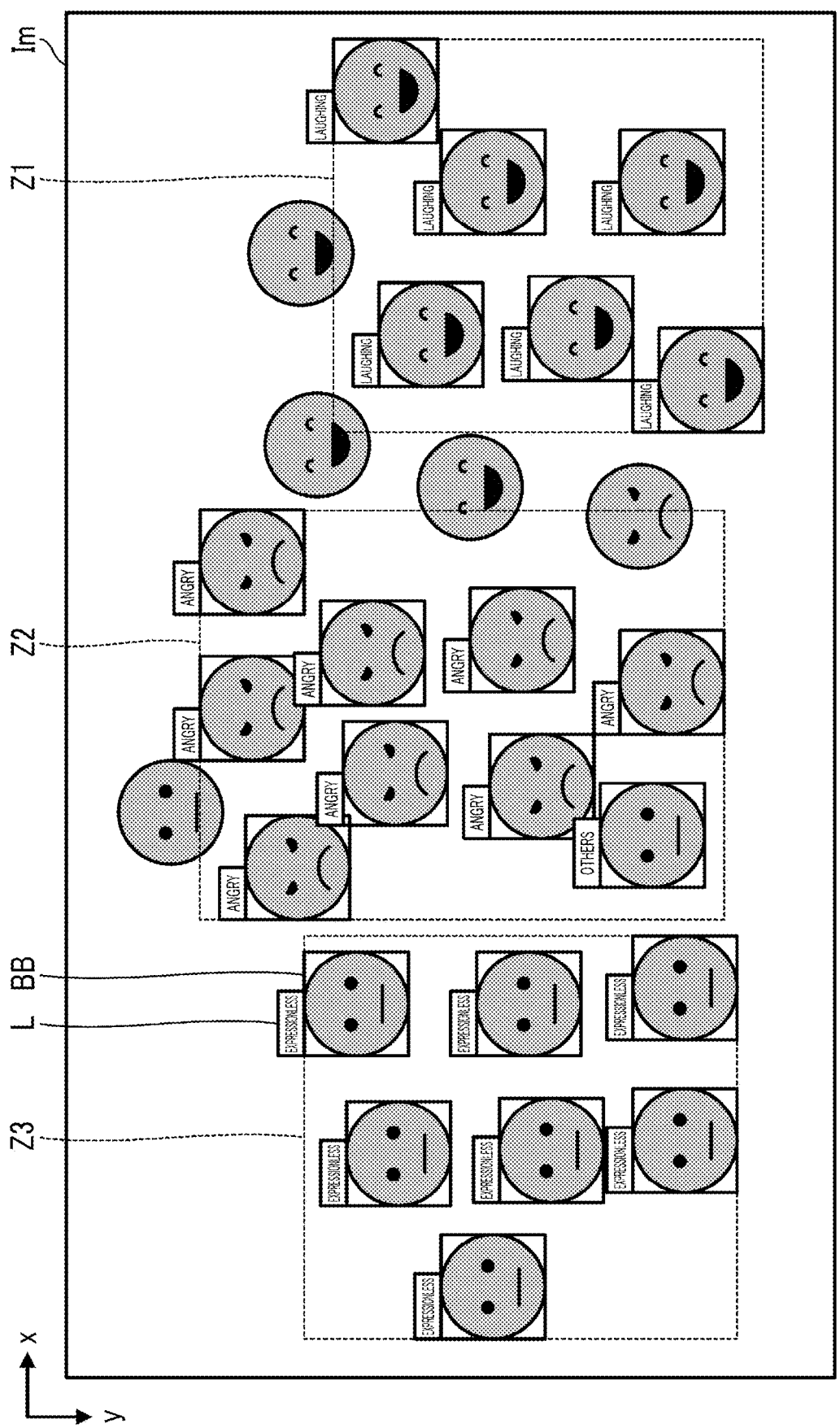
FIG. 8 is a diagram showing an example of integration of detection results by a detection result integration unit.

The detection result integration unit 26b performs a process of integrating the detection results of the detection units. FIG. 8 is a diagram showing an example of integration of the detection results by the detection result integration unit. As shown in FIG. 8, the detection results (information on a position and expression of the face) of the face detected by the first detection unit 26a1 to the third detection unit 26a3 are integrated to generate a face detection result for one image. The generated face detection result corresponds to the face detection result in the image represented by the image data acquired by the image data acquisition unit 21.

The detection result output unit 27 performs a process of outputting a detection result of the face detected in the series of processes. As the face detection result, information on the position and expression of each detected face is output.

The information on the face detection result output from the detection result output unit 27 is associated with the image data and stored in the auxiliary storage device 14. Alternatively, the information is output to the outside via the input/output interface 17 and the communication interface 18. The information is output to the display 16 as necessary. The display 16 displays an image in which the detected face is surrounded by a bounding box and is labeled with the discriminated expression (see FIG. 7).

[Detection Operation]

Figure 9:
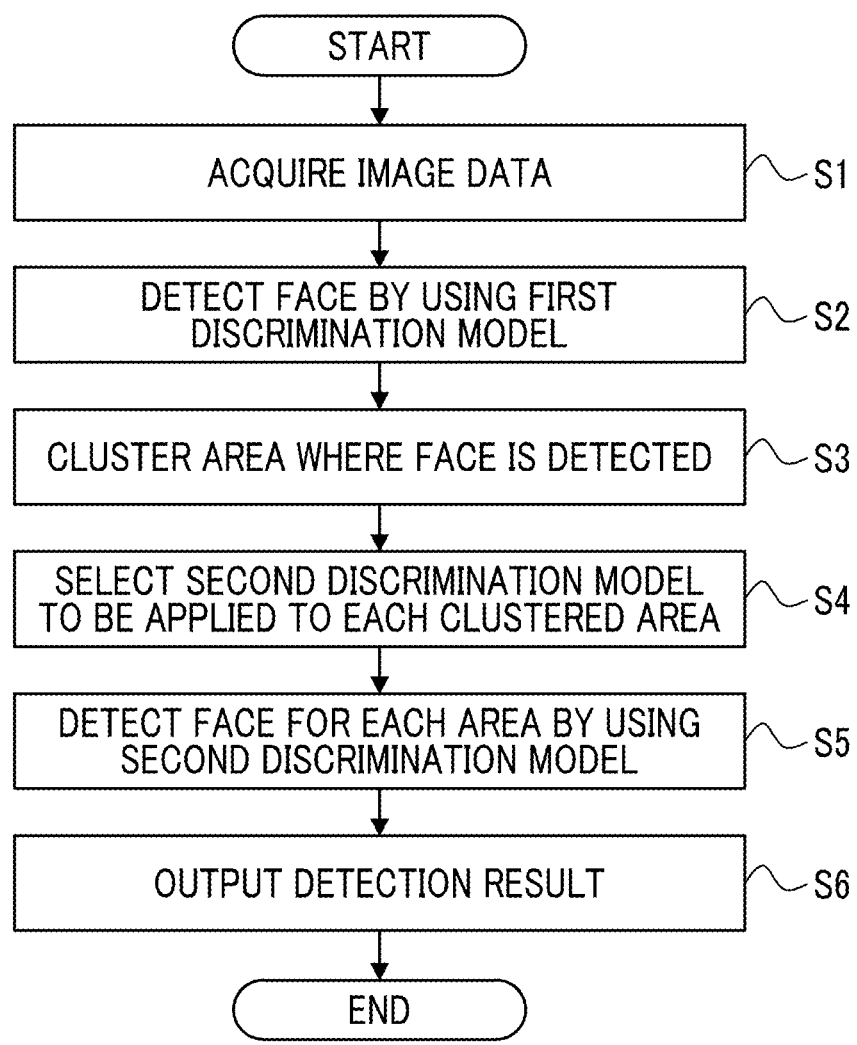
FIG. 9 is a flowchart showing a processing procedure of a detection operation of a face by the image data processing device.

FIG. 9 is a flowchart showing a processing procedure of a detection operation of a face by the image data processing device.

First, image data to be processed is acquired (Step S1/image data acquisition process by the image data acquisition unit 21). The image data is input to the image data processing device 10 via the input/output interface 17 or the communication interface 18.

Next, a process of detecting a face by using the first discrimination model is performed on the acquired image data (Step S2/first discrimination process by the first discrimination unit 22). The face is detected from the entire image represented by the image data. In addition, the face is detected by specifying a position and expression thereof in the image. The detection of the face using the first discrimination model is coarser than the detection of the face using the second discrimination model. In other words, in the face detection using the first discrimination model, faces of each expression are automatically randomly sampled from the image.

Next, an area where a face is detected from the image is clustered (Step S3/clustering process by the clustering unit 23). The clustering is performed according to a type of the second discrimination model. In the present embodiment, the second discrimination process is prepared for each type of the expression discriminated by the first discrimination model. Therefore, the clustering is performed according to a type of the expression discriminated by the first discrimination model. An area of each expression is set by the clustering. In the present embodiment, a laughing expression area, an angry expression area, and an expressionless area are set.

Next, a second discrimination model to be applied to each clustered area is selected (Step S4/selection process by the second discrimination model selection unit 24). This process is performed based on information on a type of an expression of a face in each clustered area. That is, a second discrimination model of the type of the expression corresponding to each area is selected. Therefore, a second discrimination model for a laughing expression is selected for the laughing expression area, a second discrimination model for an angry expression is selected for the angry expression area, and a second discrimination model for no expression is selected for the expressionless area.

Next, a process of detecting a face from an image of each area is performed using the second discrimination model applied to each area (Step S5/second discrimination process by the second discrimination unit 26). Therefore, a face is detected using the second discrimination model for a laughing expression in the laughing expression area, a face is detected using the second discrimination model for an angry expression in the angry expression area, and a face is detected using a second discrimination model for no expression in the expressionless area. In each area, the face is detected from the image of each area. In addition, the face is detected by specifying a position and expression thereof in the image. The second discrimination model can detect the face with a higher accuracy than the first discrimination model with respect to a corresponding expression. Therefore, the detection of the face here is more accurate than the detection of the face using the first discrimination model. The detection results of the face in each area are integrated and output from the second discrimination unit 26.

The face detection result output from the second discrimination unit 26 is output by the detection result output unit 27 as a face detection result for the input image (Step S6). As the detection result, information on the position and expression of each detected face is output.

As described above, in the image data processing device 10 of the present embodiment, first, a face is roughly detected from the entire image using a general-purpose first discrimination model. Next, an areas of the face that has been successfully detected is clustered according to a type of the second discrimination model. Next, the face is detected with a high accuracy using an exclusive second discrimination model for each clustered area. As a result, the face can be efficiently detected from an image including a plurality of faces.

The image data processing device 10 of the present embodiment is effective in detecting faces of visitors, particularly in events such as plays, concerts, and sports. That is, the image data processing device 10 is effective in detecting faces of a group consisting of a large number of persons. In events such as plays, concerts, and sports, each visitor shares emotions with the surrounding visitors in each scene, and is considered to have a similar expression to the surrounding visitors. Therefore, by performing clustering according to a type of the expression, selecting a corresponding type of a discriminator (second discriminator), and detecting a face, a face can be detected with a high accuracy even in an image including a large number of faces. In this way, the image data processing device 10 of the present embodiment can efficiently detect a face from an image including a large number of faces by using a relationship among emotions of a group.

Modification Example

Modification Example for Detection Procedure

In the above-described embodiment, each of the first discrimination process, the clustering process, the selection process, and the second discrimination process is executed once in the order of the first discrimination process, the clustering process, the selection process, and the second discrimination process. In this case, the clustering is performed only based on the face detection result by the first discrimination unit 22.

The detection of the face is also performed by the second discrimination unit 26. Therefore, it is also possible to perform the clustering process by using the face detection result by the second discrimination unit 26. In this example, the clustering process is executed again using the face detection result by the second discrimination unit 26, and the face detection process using the second discrimination model is executed. That is, after each process is executed once in the order of the first discrimination process, the clustering process, the selection process, and the second discrimination process, the clustering process, the selection process, and the second discrimination process are executed again based on a result of the second discrimination process. In this example, the clustering process, the selection process, and the second discrimination process are repeatedly executed a predetermined number of times. That is, the execution is repeated until a predetermined number of times is reached. The predetermined number of times is an example of a predetermined condition.

Figure 10:
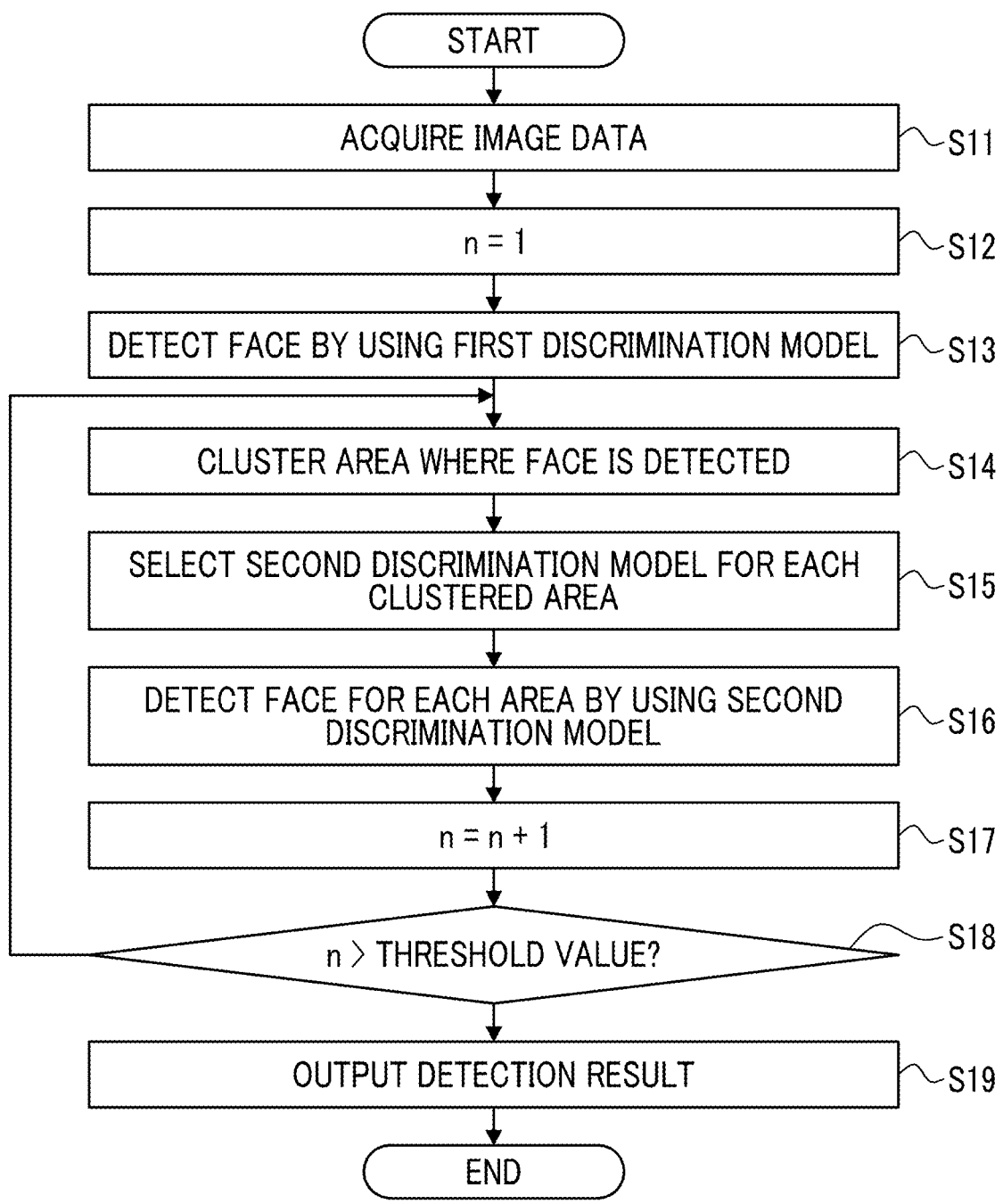
FIG. 10 is a flowchart showing a processing procedure of a detection operation of a face according to a modification example.

FIG. 10 is a flowchart showing a processing procedure of a detection operation of a face according to a modification example.

First, image data to be processed is acquired (Step S11/image data acquisition process by the image data acquisition unit 21).

Next, a count number n is set to 1. That is, n=1 (Step S12).

Next, a process of detecting a face by using the first discrimination model is performed on the acquired image data (Step S13/first discrimination process by the first discrimination unit 22).

Next, an area where a face is detected from the image is clustered (Step S14/clustering process by the clustering unit 23). Here, the clustering is performed based on the face detection result using the first discrimination model.

Next, a second discrimination model to be applied to each clustered area is selected (Step S15/selection process by the second discrimination model selection unit 24).

Next, a process of detecting a face from an image of each area is performed using the second discrimination model applied to each area (Step S16/second discrimination process by the second discrimination unit 26).

Next, the count number n is counted up. That is, n=n+1 (Step S17).

Next, it is determined whether or not the count number n exceeds a threshold value (Step S18). The threshold value is a predetermined number of repetitions.

In a case where it is determined in Step S18 that the count number n exceeds the threshold value, the face detection result output from the second discrimination unit 26 is output by the detection result output unit 27 as a face detection result for the input image (Step S19).

In a case where it is determined in Step S18 that the count number n does not exceed the threshold value, the process returns to Step S14 and the clustering process is performed. Here, the clustering is performed based on the face detection result using the second discrimination model. Therefore, more faces are included. After the clustering process, the selection process (Step S15) and the second discrimination process (Step S16) are executed based on a result of the clustering process. The clustering process (Step S14), the selection process (Step S15), and the second discrimination process (Step S16) are repeatedly executed until the count number n exceeds the threshold value.

In this way, more faces can be detected by repeatedly executing the clustering process, the selection process, and the second discrimination process by using a result of the second discrimination process. That is, in the second discrimination process, it is possible to detect a face that could not be detected in the first discrimination process. Therefore, it is possible to detect more faces by executing the clustering process or the like again using the detection result.

In this example, each of the clustering process, the selection process, and the second discrimination process is repeatedly executed a predetermined number of times, but conditions for ending the repetition of each process are not limited thereto. For example, the process may be repeatedly executed until a predetermined number of faces are detected from the image. In addition, the predetermined number of times may be optionally set by a user. The setting is performed via the operation unit 15.

Modification Example of Attribute of Face to be Discriminated

In the above-described embodiment, a case where three types of expressions are discriminated has been described as an example, but the types of expressions to be discriminated are not limited thereto. For example, expressions corresponding to seven types of emotions, which are "joy", "anger", "dislike", "surprise", "fear", "sadness", and "no emotion" may be discriminated.

In addition, in the above-described embodiment, the expression is discriminated as an attribute of the face, but other attributes of the face, such as age and gender, may be discriminated instead of or in addition to the expression of the face. For example, as an attribute of the face, it may be also possible to discriminate age and/or gender in addition to the expression.

Further, as an attribute of the face, an orientation of the face may be discriminated. In this case, in addition to the expression of the face, the orientation of the face may be discriminated.

In this way, the attributes of the face to be discriminated may be discriminated by combining a plurality of types.

The second discrimination model does not necessarily have to be prepared corresponding to all types of the attributes discriminated by the first discrimination model.

FIG. 11 is a diagram showing an example of a relationship between an attribute of the face discriminated by the first discrimination model and a type of the second discrimination model.

FIG. 11 shows an example of a case where an expression and orientation of the face are discriminated by the first discrimination model. In this example, three types of expressions of "laughing", "angry", and "expressionless" are discriminated as the expression of the face. In addition, as the orientation of the face, three orientations of "front", "right sideways", and "left sideways" are discriminated. Therefore, in this case, faces of nine types of attributes are discriminated by the first discrimination model. That is, a face with a laughing expression facing the front (front×laughing), a face with a laughing expression facing sideways to the right (right sideways×laughing), a face with a laughing expression facing sideways to the left (left sideways×laughing), a face with an angry expression facing the front (front×angry), a face with an angry expression facing sideways to the right (right sideways×angry), a face with an angry expression facing sideways to the left (left sideways×angry), a face with no expression facing the front (front×expressionless), a face with no expression facing sideways to the right (right sideways×expressionless), and a face with no expression facing sideways to the left (right sideways×expressionless) are discriminated.

As the second discrimination model, a discrimination model for a laughing expression, a discrimination model for an angry expression, and a discrimination model for no expression are prepared. The discrimination model of each expression constituting the second discrimination model detects a face with a higher accuracy than the first discrimination model with respect to a corresponding expression of the face. Therefore, faces in a plurality of orientations can be detected with respect to the corresponding expression of the face.

Figure 12:
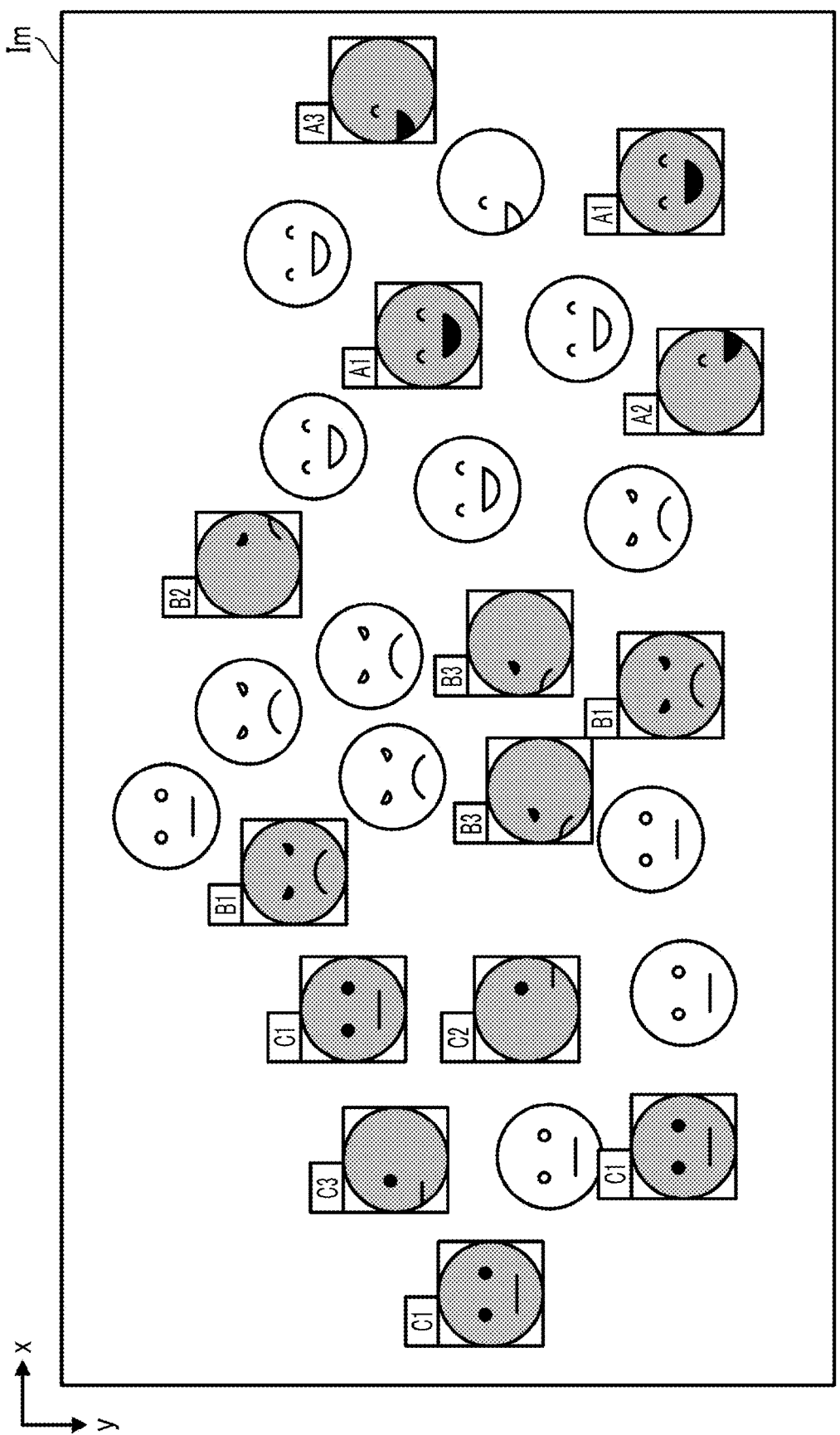
FIG. 12 is a diagram showing an example of a detection result of a face using the first discrimination model.

FIG. 12 is a diagram showing an example of a detection result of a face using the first discrimination model.

In FIG. 12, a face surrounded by a rectangular frame is a face detected from an image Im. Each frame is attached with a label indicating an attribute of the face discriminated for each face within the frame. There are nine types of labels (type of expression of face×type of orientation of face). Contents of each label are as follows. A1 is a label attached to a face with a laughing expression facing the front (front× laughing). A2 is a label attached to a face with a laughing expression facing sideways to the right (right sideways× laughing). A3 is a label attached to a face with a laughing expression facing sideways to the left (left sideways×laughing). B1 is a label attached to a face with an angry expression facing the front (front×angry). B2 is a label attached to a face with an angry expression facing sideways to the right (right sideways×angry). B3 is a label attached to a face with an angry expression facing sideways to the left (left sideways× angry). C1 is a label attached to a face with no expression facing the front (front×no expression). C2 is a label attached to a face with no expression facing sideways to the right (right sideways×no expression). C3 is a label attached to a face with no expression facing sideways to the left (left sideways×no expression).

Figure 13:
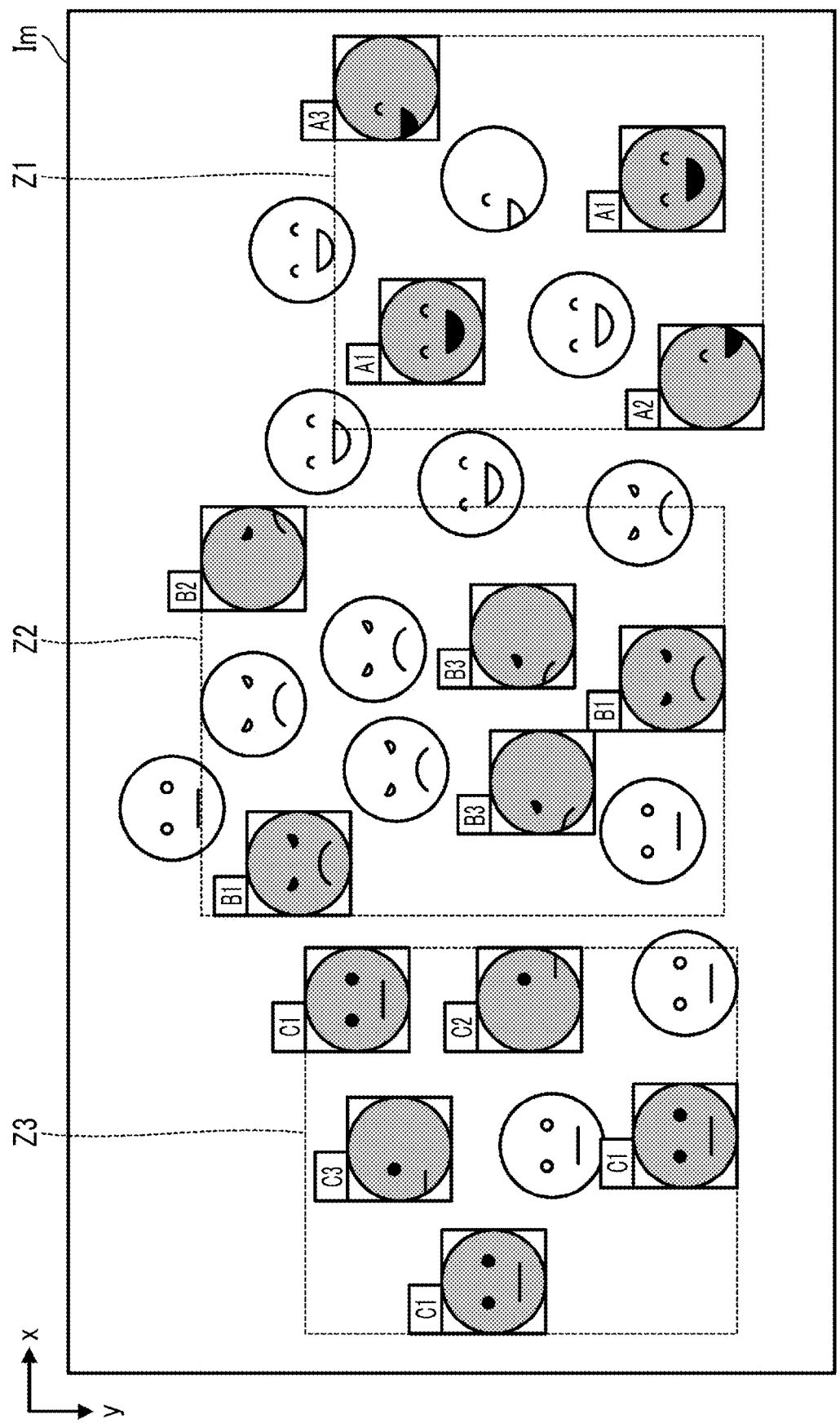
FIG. 13 is a diagram showing an example of a result of the clustering process.

FIG. 13 is a diagram showing an example of a result of the clustering process.

The clustering is performed according to a type of the second discrimination model. Therefore, in this example, the clustering is performed according to the type of expression regardless of the orientation of the face. That is, the expressions are classified into a cluster of laughing expressions, a cluster of angry expressions, and a cluster of no expression, and an area of each expression is set. In FIG. 13, an area represented by a reference numeral Z1 is a clustered laughing expression area. An area represented by a reference numeral Z2 is a clustered angry expression area. An area represented by a reference numeral Z3 is a clustered expressionless area.

In this way, in a case where a face is detected using the first discrimination model, by increasing the types of the discriminable attributes of the face, it is possible to detect faces of a plurality of attributes. In this example, it is possible to detect faces in a plurality of orientations for each expression.

Modification Example for Face Detection by Second Discrimination Model

In the above-described embodiment, in the second discrimination model, it is discriminated whether or not the expression of the detected face is of a corresponding type of the expression. The expression to be discriminated by the second discrimination model is not limited thereto. For example, the attributes of the face may be discriminated by classifying the types in more detail within a range of a corresponding type of the attribute. For example, in a case where the expression of the face is discriminated as the attribute of the face, a corresponding type of the expression may be classified in more detail and discriminated. In this case, for example, the second discrimination model corresponding to a laughing expression classifies the laughing expression into "loud laughter", "medium laughter", "small laughter", and the like for discrimination. This enables more detailed detection of the expression.

Modification Example for Clustering

In the above-described embodiment, a rectangular frame including faces belonging to each cluster is set, and an area of each cluster is set. A method of setting the area of each cluster is not limited thereto.

Figure 14:
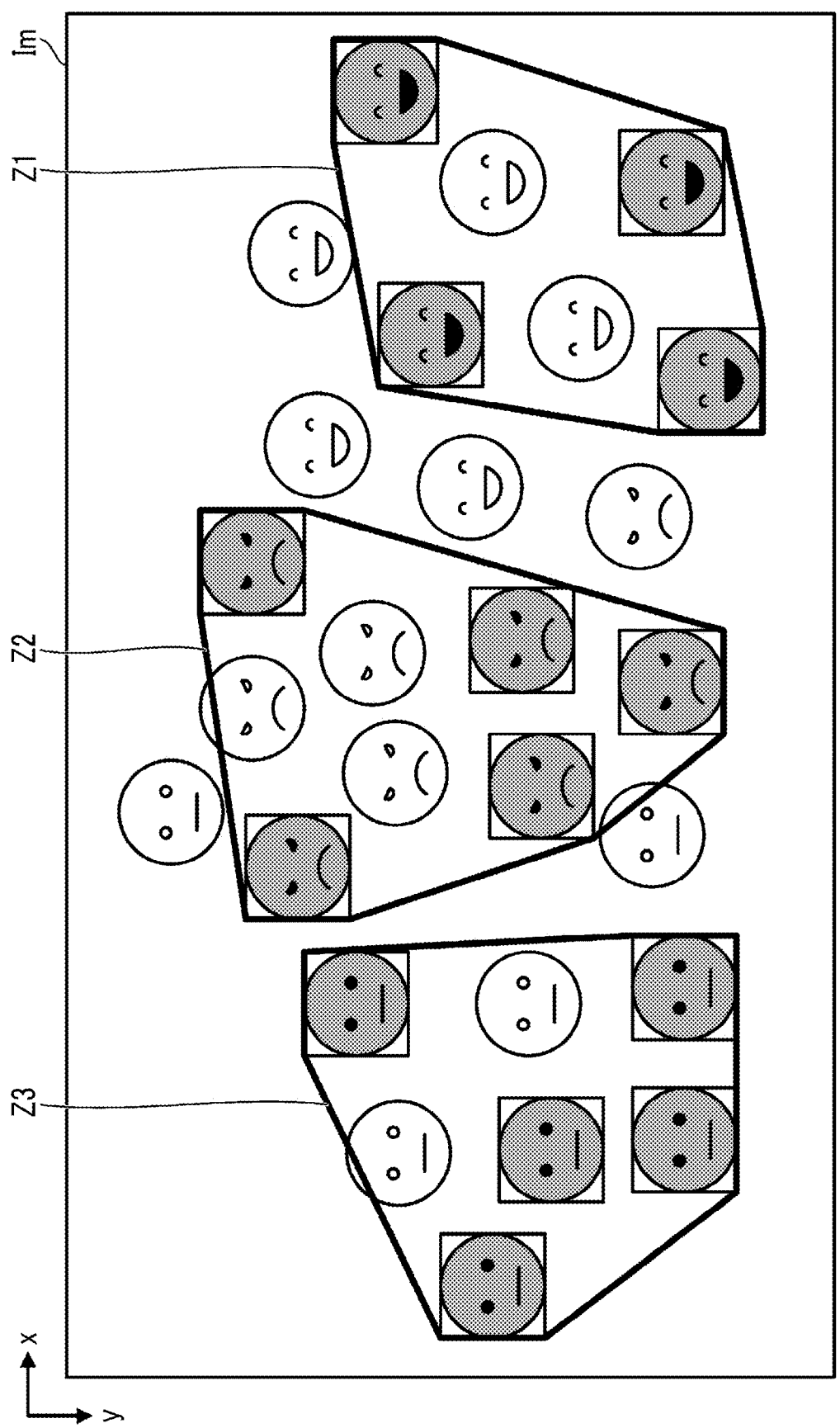
FIG. 14 is a diagram showing another example of setting an area.

FIG. 14 is a diagram showing another example of setting the area.

In the example shown in FIG. 14, for faces belonging to each cluster, a polygonal frame circumscribing the face located on the outermost side is set, and an area within the frame is set as an area of each cluster. In FIG. 14, an area represented by a reference numeral Z1 is a laughing expression area. An area represented by a reference numeral Z2 is an angry expression area. An area represented by a reference numeral Z3 is an expressionless area.

In addition, for faces belonging to each cluster, a polygonal frame can be set by connecting the faces located on the outermost side, and an area within the frame can be set as an area of each cluster.

[For Image Data to be Processed]

The image data to be processed may be image data of a video image or image data of a still image. The image data of the video image is processed in frame units. In this case, all frames do not necessarily have to be processed as a target. The image data may be processed at predetermined frame intervals.

Second Embodiment

As described above, in events such as concerts, plays, and sports, a variety of information can be analyzed by measuring and collecting emotions of visitors.

In the present embodiment, a system (emotion measurement system) for measuring emotions of visitors in events such as concerts, plays, and sports will be described.

[System Configuration]

Figure 15:
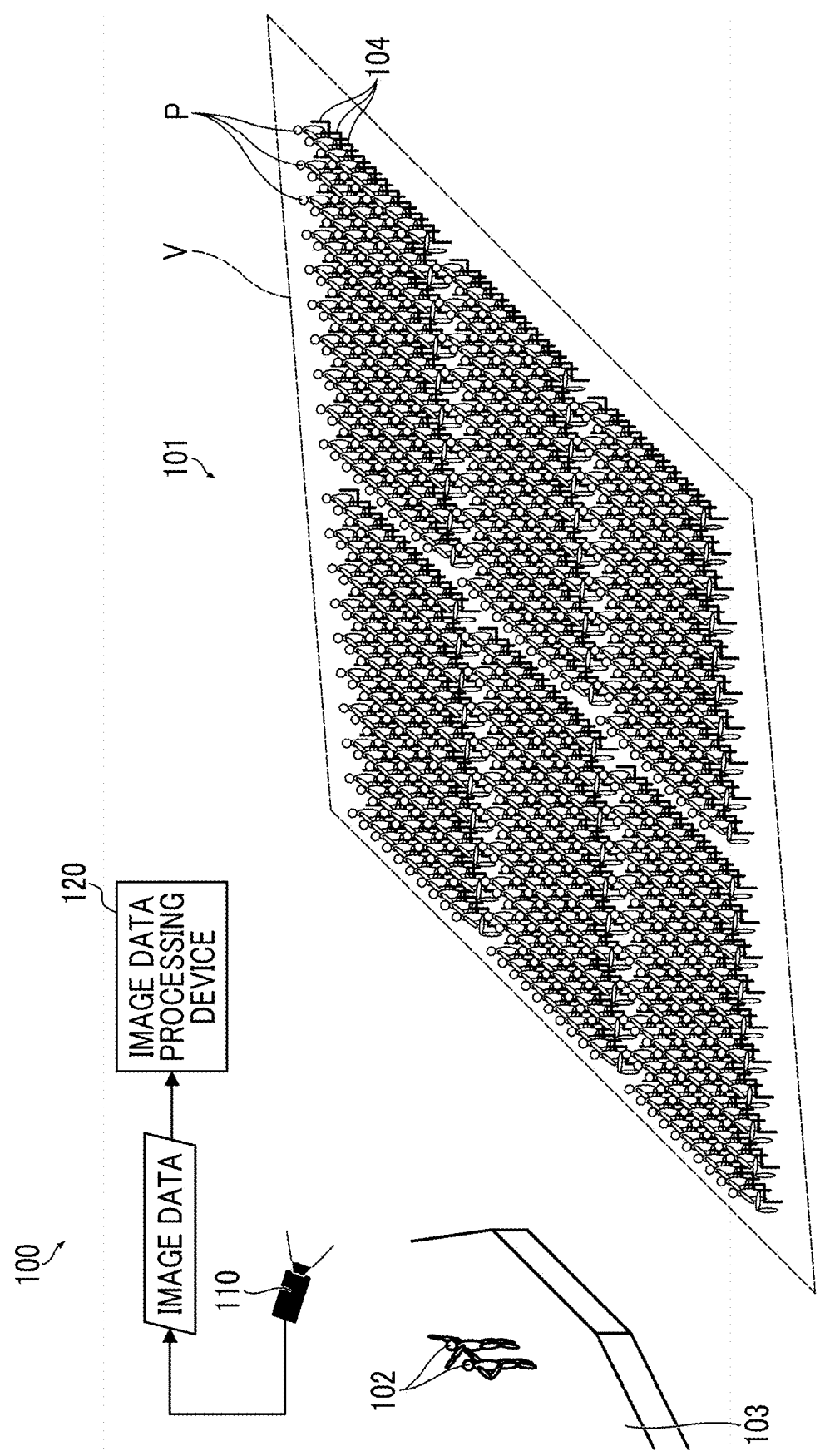
FIG. 15 is a diagram showing a schematic configuration of an emotion measurement system.

FIG. 15 is a diagram showing a schematic configuration of an emotion measurement system.

An emotion measurement system 100 of the present embodiment is configured as a system that measures and collects emotions of spectators (visitors) in a venue at an event venue where a show is held. The emotions of the spectators are measured based on an image obtained by capturing the spectators.

As shown in FIG. 15, the emotion measurement system 100 of the present embodiment comprises an imaging device 110 that images the spectators in the venue and an image data processing device 120 that processes image data captured by the imaging device 110. The emotion measurement system 100 of the present embodiment is an example of an image data processing system.

An event venue 101 has a stage 103 where a performer 102 performs a show, and a viewing area V where a spectator P watches the show. Seats 104 are regularly arranged in the viewing area V. The spectator P sits in the seat 104 and watches the show. A position of each seat 104 is fixed.

[Imaging Device]

The imaging device 110 is constituted by a digital camera having a function of capturing a video image. In the present embodiment, the entirety of the viewing area V is imaged by one imaging device 110. Therefore, the imaging device 110 is configured by a digital camera capable of imaging the entirety of the viewing area V. The fact that the entirety of the viewing area V can be imaged means that the entirety of the viewing area V can be contained within an angle of view and the imaging can be performed with an image quality (resolution) at which expressions of a face of each spectator in the viewing area V can be discriminated from the captured image. The imaging device 110 images the viewing area V from a fixed position (fixed point).

[Image Data Processing Device]

The image data processing device 120 measures and records the emotions of each spectator in the venue by inputting and processing the image data output from the imaging device 110. The emotions are discriminated from the expressions of the face. Therefore, in the system of the present embodiment, discriminating the expressions of the face means discriminating the emotions. In the present embodiment, three types of expressions of "laughing", "angry", and "expressionless" are discriminated. In this case, the expression of "laughing" corresponds to an emotion of pleasure or enjoyment. In addition, the expression of "angry" corresponds to an emotion of anger. In addition, "expressionless" corresponds to a state that is not in a specific emotion. The expressions (emotions) of each detected face are recorded by generating map data.

The image data processing device 120 generates a heat map representing a state or attribute of the spectator at each position in response to an instruction from the user. The generated heat map is displayed on a display in response to an instruction from the user. In addition, the heat map is output to an external apparatus in response to an instruction from the user.

A hardware configuration of the image data processing device 120 is substantially the same as that of the image data processing device 10 of the first embodiment described above. That is, the image data processing device 120 is constituted by a computer comprising a CPU, a ROM, a RAM, an auxiliary storage device, an operation unit, a display, an input/output interface, a communication interface, and the like (see FIG. 1).

The image data captured by the imaging device 110 is input to the image data processing device 120 via the input/output interface or the communication interface.

Figure 16:
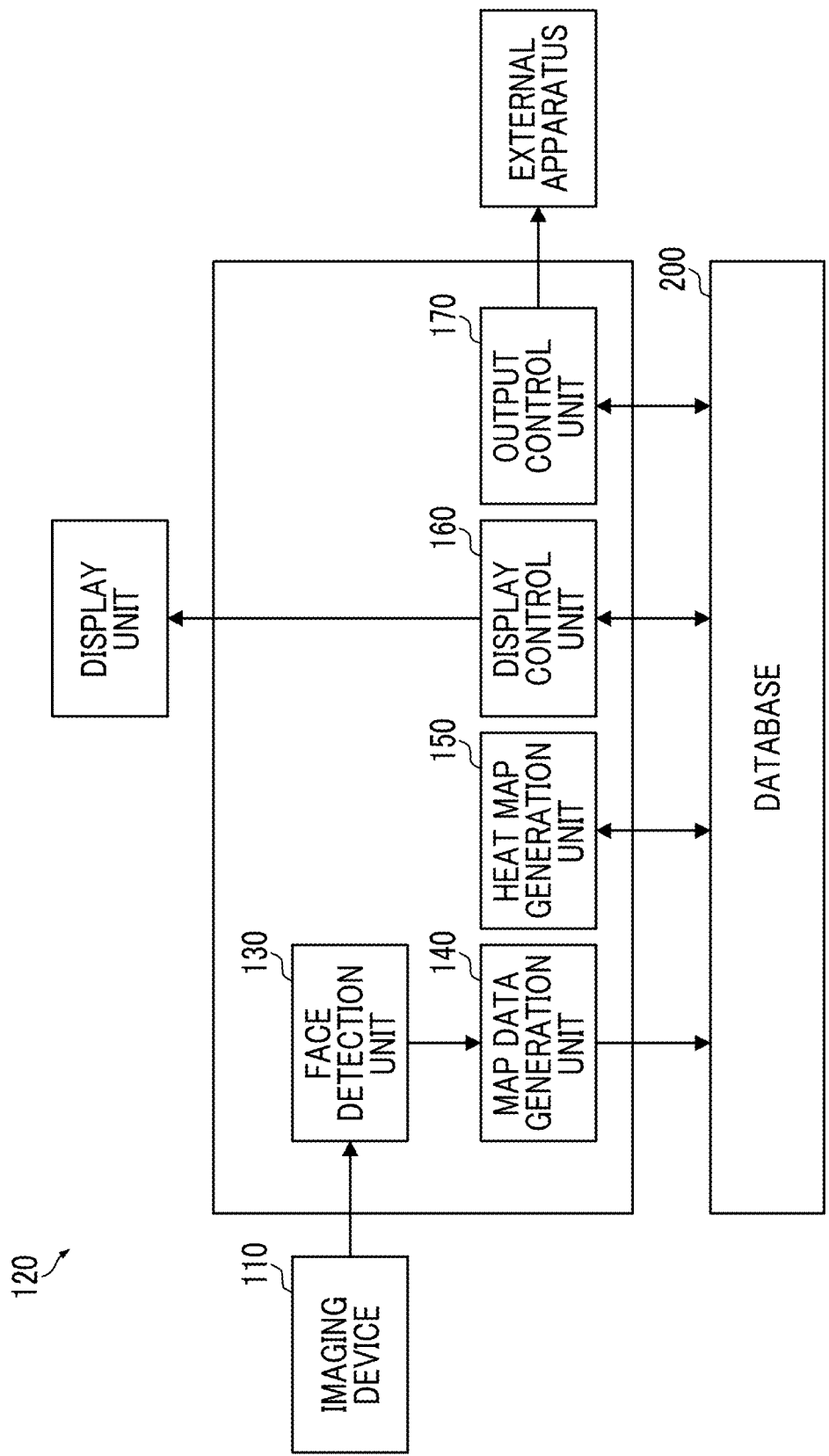
FIG. 16 is a block diagram of a function realized by the image data processing device.

FIG. 16 is a block diagram of a function realized by the image data processing device.

As shown in FIG. 16, the image data processing device 120 mainly has functions of a face detection unit 130, a map data generation unit 140, a heat map generation unit 150, a display control unit 160, and an output control unit 170. The functions of the respective parts are realized by the CPU executing a predetermined program. The program executed by the CPU is stored in the ROM, the auxiliary storage device, or the like.

The face detection unit 130 detects a face from an image represented by image data to be processed and discriminates and outputs an expression of the detected face. The function of the face detection unit 130 is substantially the same as the function of the image data processing device 10 according to the first embodiment described above. That is, the face detection unit has functions of an image data acquisition unit, a first discrimination unit, a clustering unit, a second discrimination model selection unit, an area extraction unit, a second discrimination unit, and a detection result output unit. The functions of the respective parts are the same as those of the image data processing device 10 of the first embodiment described above. Accordingly, a detailed description thereof will be omitted.

The image data to be processed is image data output from the imaging device 110. The image data output from the imaging device 110 is image data of a video image. The face detection unit 130 processes the image data in frame units and detects a face from the image. The face is detected by specifying a position thereof in the image. Therefore, information on a position and expression of the detected face is output from the face detection unit 130 in frame units. The detection does not necessarily have to be performed at all frames, and may be performed at predetermined frame intervals.

The map data generation unit 140 performs a process of generating map data (map data generation process). The map data generation unit 140 generates map data based on the information on the position and expression of each face detected by the face detection unit 130. The map data is generated by recording each face detected by the face detection unit 130 by associating information on a position of the face in the image with information on the discriminated expression. The map data is generated in frame units in the same manner as the face detection. The generated map data is recorded in a database 200 in association with image data of a generation source. The database 200 is stored in, for example, the auxiliary storage device.

The heat map generation unit 150 performs a process of generating a heat map (heat map generation process). The heat map generation unit 150 generates a heat map representing a state or attribute of each spectator based on the map data. The heat map is an image in which the state or attribute of the spectator at each position is represented by colors or shades of colors. In the present embodiment, an image in which the state of the emotion (expression) of the spectator at each position is represented by colors or shades of colors is created as a heat map.

Figure 17:
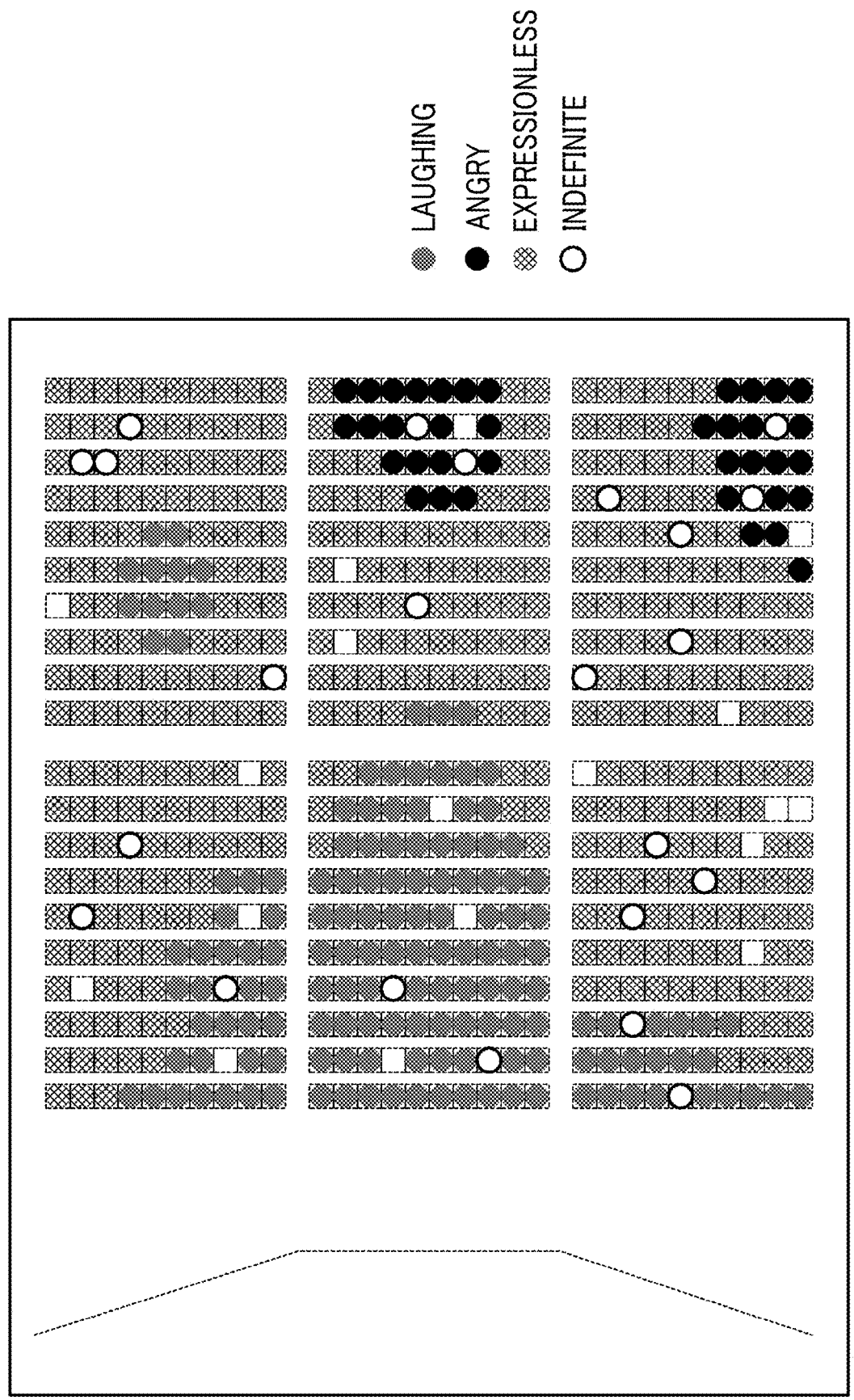
FIG. 17 is a diagram showing an example of a heat map.

FIG. 17 is a diagram showing an example of the heat map.

In FIG. 17, a heat map is generated using a seat map of the event venue. The seat map is a view showing arrangement of seats in the event venue in a plan view. A position of the seat corresponds to a position of each spectator. The position of each seat in the seat map can correspond to a coordinate position of each spectator on the map data on a one-to-one basis. Therefore, by displaying dots of colors or color densities corresponding to the emotion (expression) of the spectator sitting in the seat at the position of each seat, a heat map representing the state of the emotion (expression) of each spectator can be obtained. In the example shown in FIG. 17, a color (density on the drawing) is individually assigned to each of the expressions of "laughing", "angry", "expressionless", and "indefinite" to represent the state of the emotion (expression) of the spectator in each seat. In addition, "indefinite" represents a spectator whose specific expression could not be discriminated and a spectator whose face could not be detected.

The heat map data generated by the heat map generation unit 150 is recorded in the database 200 in association with data of a generation source.

The display control unit 160 executes a process (display control process) of displaying the data generated by the map data generation unit 140 on the display in response to a display instruction from the user input via the operation unit. In addition, the heat map generated by the heat map generation unit 150 is displayed on the display.

The output control unit 170 executes a process (output control process) of outputting the data generated by the map data generation unit 140 to the external apparatus in response to an output instruction from the user input via the operation unit. In addition, a process (output control process) of outputting the heat map data generated by the heat map generation unit 150 to the external apparatus is executed.

[Action]

In the emotion measurement system of the present embodiment configured as described above, the emotions of the spectators are measured as follows.

First, the viewing area V is imaged by the imaging device 110. The imaging is executed throughout the entire time during the event. That is, the video image is continuously captured from the start to the end of the event.

The image data captured by the imaging device 110 is captured in the image data processing device 120. The image data may be captured in real time, or may be captured all at once after the image has been captured.

The image data processing device 120 processes the input image data in frame units to detect the face of the spectator from an image of each frame. The face is detected by specifying a position and expression thereof in the image. Contents of the face detection process are the same as the contents of the process in the image data processing device 10 of the first embodiment. Therefore, a detailed description thereof will be omitted.

The image data processing device 120 generates map data in frame units based on the face detection result, and records the generated map data in the database 200.

By processing all the frames being a target, the measurement of the emotions of all the spectators throughout the entire time during the event is completed.

The image data processing device 120 generates a heat map from the generated data in response to an instruction from the user. In addition, the image data processing device 120 displays the generated heat map on the display 16 in response to an instruction from the user. In addition, the image data processing device 120 outputs the generated heat map to the external apparatus in response to an instruction from the user.

As described above, according to the emotion measurement system 100 of the present embodiment, the emotions of all the spectators can be measured and recorded throughout the entire time during the event.

Modification Example

Modification Example for Imaging

In the above-described embodiment, the entire viewing area is imaged by one imaging device, but it is also possible to divide and image a target area by using a plurality of imaging devices. In this case, an image captured by each imaging device may be combined to generate one image, and the face may be detected from the one image. The face may be detected individually from the image captured by each imaging device. In a case where the face is individually detected from the image captured by each imaging device, the detection results are integrated or combined to acquire the entire processing result.

Modification Example for Map Data

The map data is generated by recording each face detected from the image by associating information on a position of the face in the image with information on the discriminated attribute. Therefore, in a case where age, gender, or the like is discriminated instead of or in addition to the expression, the face is recorded in association with information on the discriminated attribute.

Modification Example for Heat Map

For the heat map, various forms can be generated based on the information recorded in the map data. For example, it is assumed that information on age and/or information on gender is recorded in the map data in addition to the information on the expression as information on the attribute of each spectator. In this case, a heat map displaying the information on age and/or gender can be generated. In the heat map of the age, for example, a dot is displayed at a position of each spectator, and a color of the dot is displayed in a color corresponding to the age or generation. In the heat map of the gender, for example, a dot is displayed at a position of each spectator, and a color of the dot is displayed in a color corresponding to the gender. In the heat map of the age and gender, for example, a dot is displayed at a position of each spectator, and a color of the dot is displayed in a color corresponding to the age and gender.

The heat map may be configured to visualize information estimated from the information recorded in the map data, instead of generating the information recorded in the map data as it is visualized. For example, an excitement state of each spectator may be estimated from the information on the expression of each spectator recorded in the map data and a heat map of the estimated excitement state may be generated. In this case, the CPU executes the estimation process and the like. The excitement state is quantified by giving a score according to the expression, for example.

Figure 18:
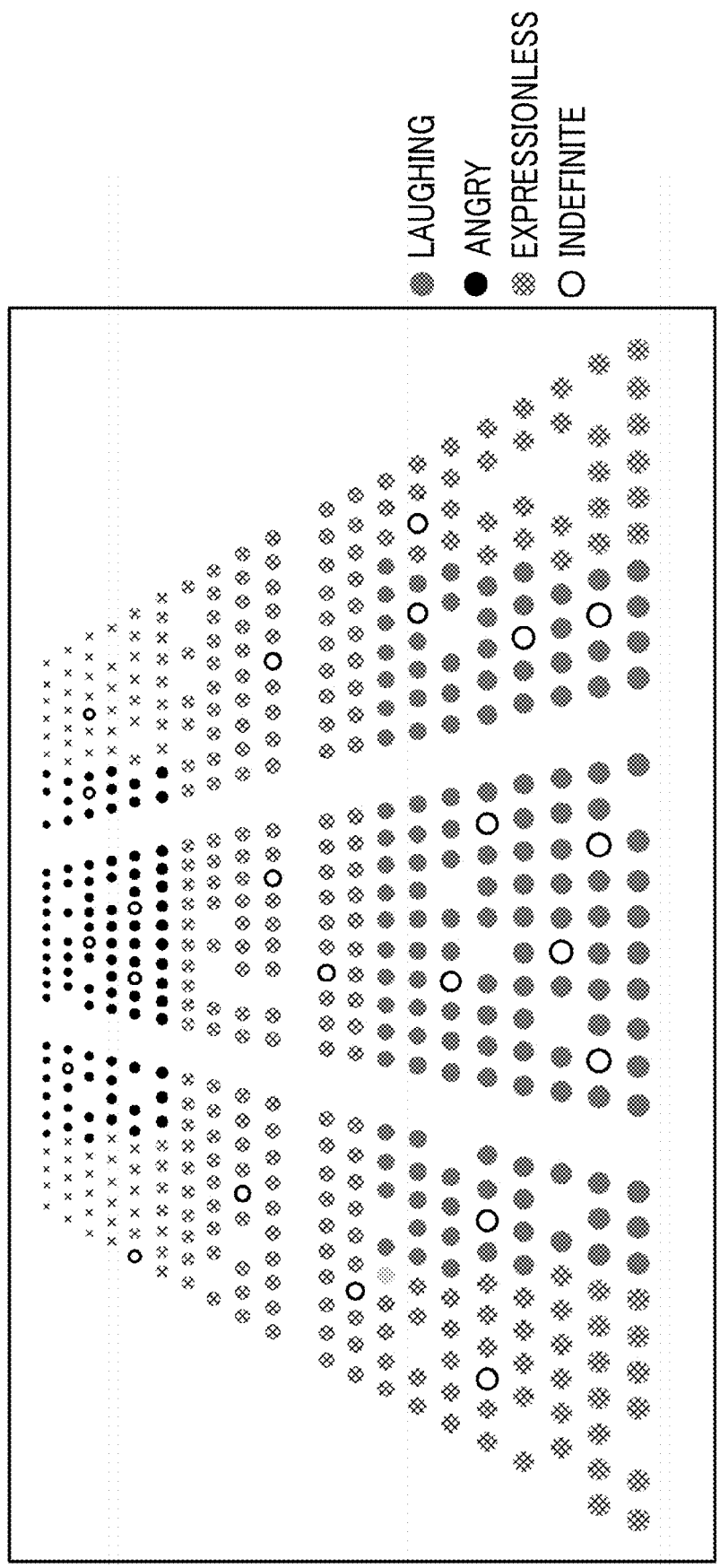
FIG. 18 is a diagram showing another example of the heat map.
Figure 19:
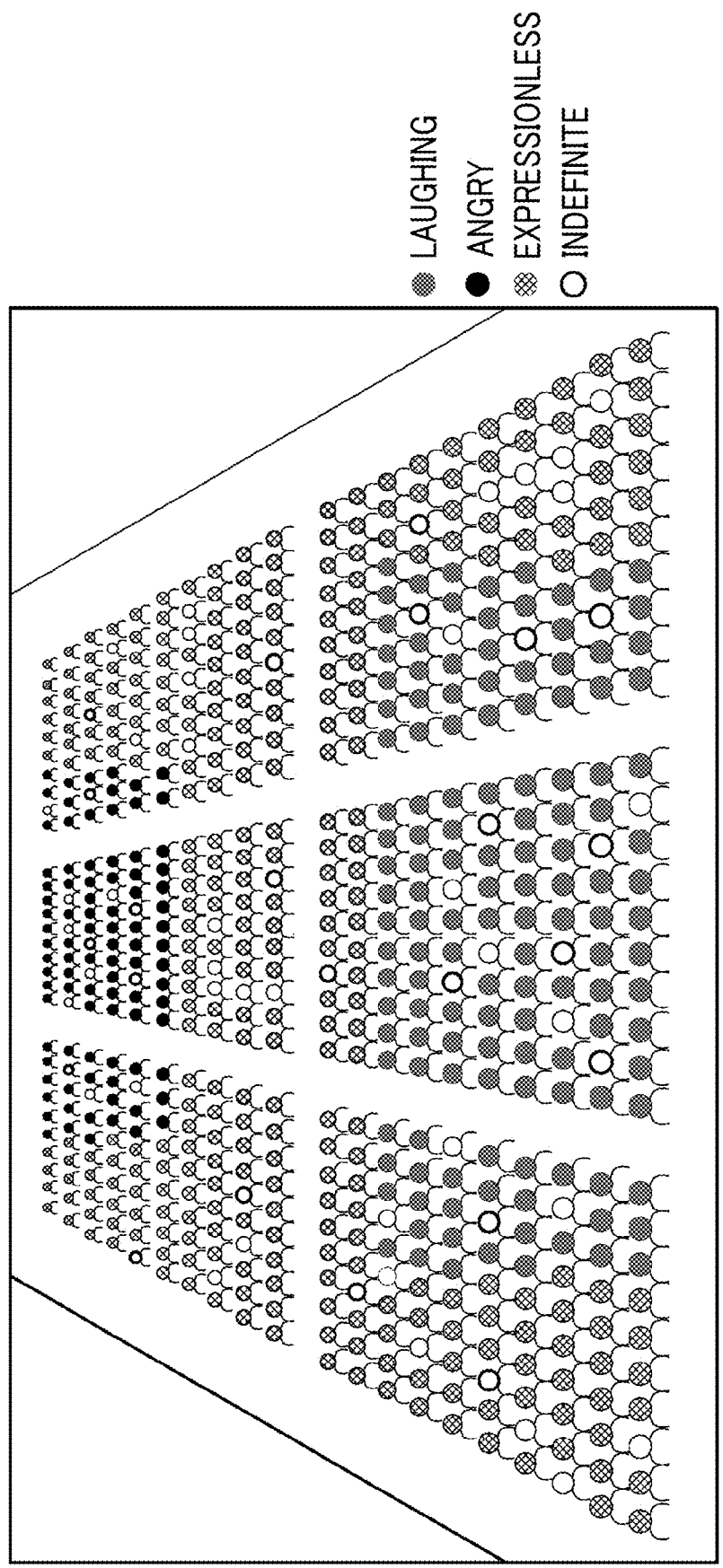
FIG. 19 is a diagram showing still another example of the heat map.

In the above-described embodiment, the heat map is generated using the seat map of the event venue, but the form of the heat map is not limited thereto. FIG. 18 is a diagram showing another example of the heat map. In the example shown in FIG. 18, dots are displayed at the positions of the faces detected in the image, and colors of the dots are displayed in colors corresponding to the emotions to generate a heat map. Each dot is displayed in a size corresponding to a size of the face detected from the image. For example, each dot is displayed as a circle inscribed in the bounding box. FIG. 19 is a diagram showing still another example of the heat map. In the example shown in FIG. 19, dots are displayed on the image to generate a heat map. Each dot is displayed by being superimposed on the position of the face detected from the image, and is displayed in a color corresponding to the expression (emotion).

Third Embodiment

In a case where a group of people is formed, the group shares the same emotions in many cases. On the other hand, in a case where a plurality of groups are formed, dominant emotions in each group are different for each group in many cases. Therefore, it is considered that in a case where a plurality of groups are formed, the face can be detected more efficiently by performing the clustering process for each group.

In the present embodiment, a case where the face is detected by executing the clustering process for each group in a case where a plurality of groups are formed is described. A basic configuration of the image data processing device is the same as that of the image data processing device of the first embodiment described above. Therefore, only the different processing functions will be described here.

Figure 20:
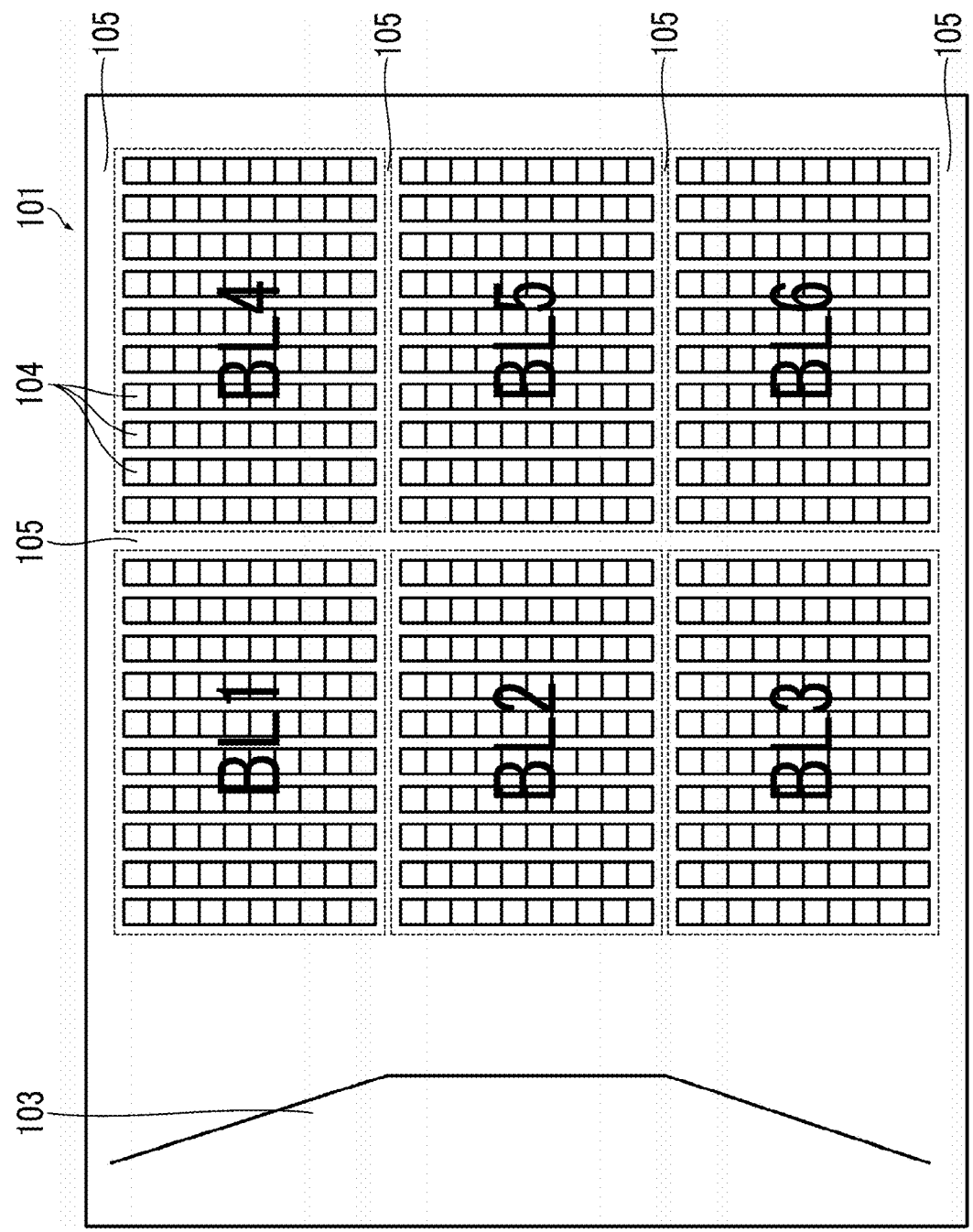
FIG. 20 is a conceptual diagram of a face detection process.

FIG. 20 is a conceptual diagram of a face detection process.

FIG. 20 shows a plan view of the event venue 101. In the event venue 101 shown in FIG. 20, the seats 104 are divided into six blocks (first block BL1 to sixth block BL6) by a passage 105. In this case, the clustering process is executed individually in block units. That is, in the first block BL1, face areas detected in the first block BL1 are clustered. Similarly, in the other blocks, face areas detected in the blocks are clustered. The area constituting each block is an example of a processing target area.

Figure 21:
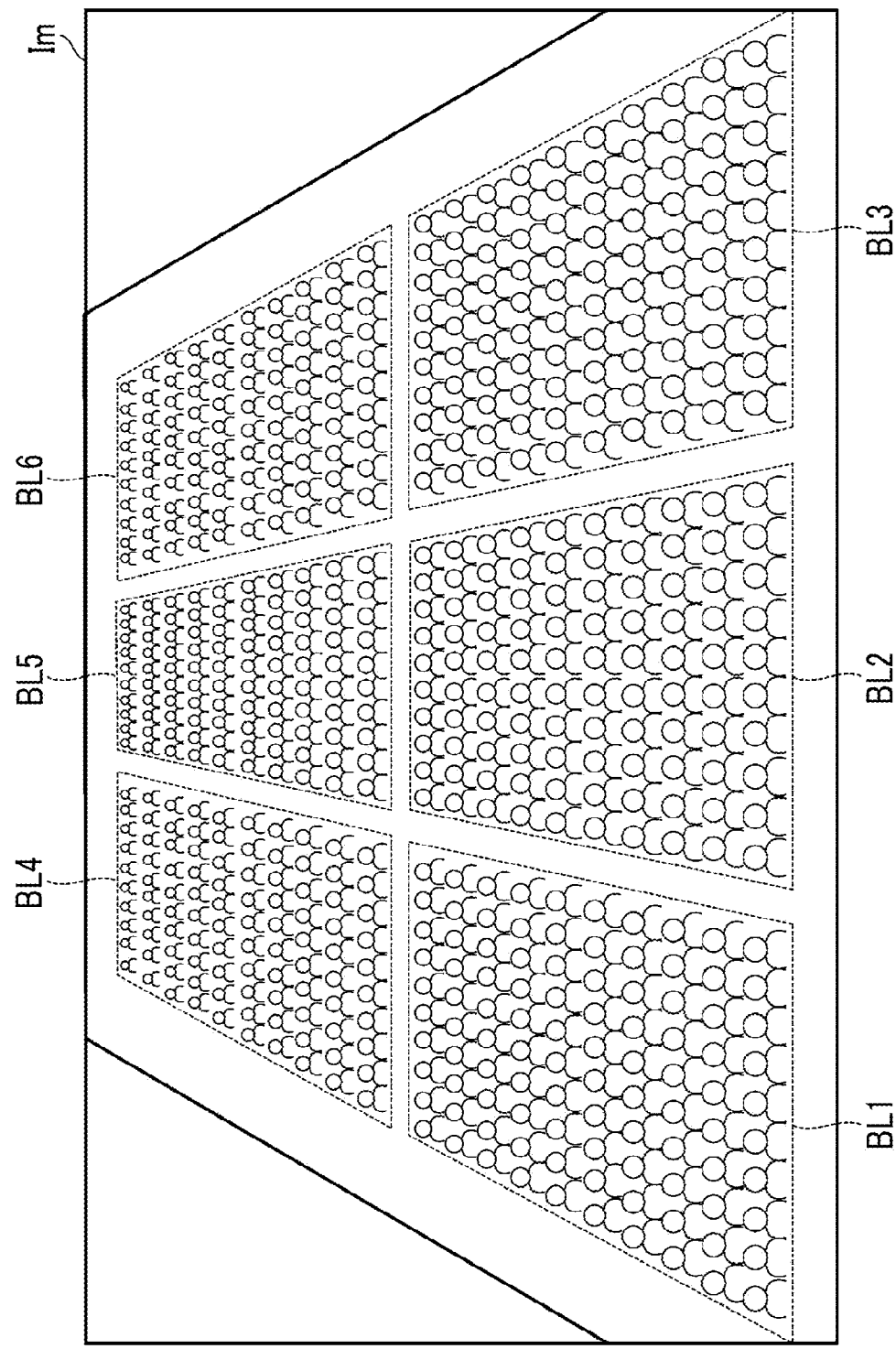
FIG. 21 is a conceptual diagram showing an example of an image to be captured.

FIG. 21 is a conceptual diagram showing an example of an image to be captured.

In a case where the imaging device images an inside of the venue from a fixed position, a region occupied by each of the blocks BL1 to BL6 is uniquely determined in a captured image Im. Therefore, positions, sizes, and shapes of the blocks BL1 to BL6 in the image Im can be obtained in advance.

The clustering unit performs the clustering process for each block based on the information (position, size, and shape) on the area of each of the blocks BL1 to BL6 obtained in advance.

Figure 22:
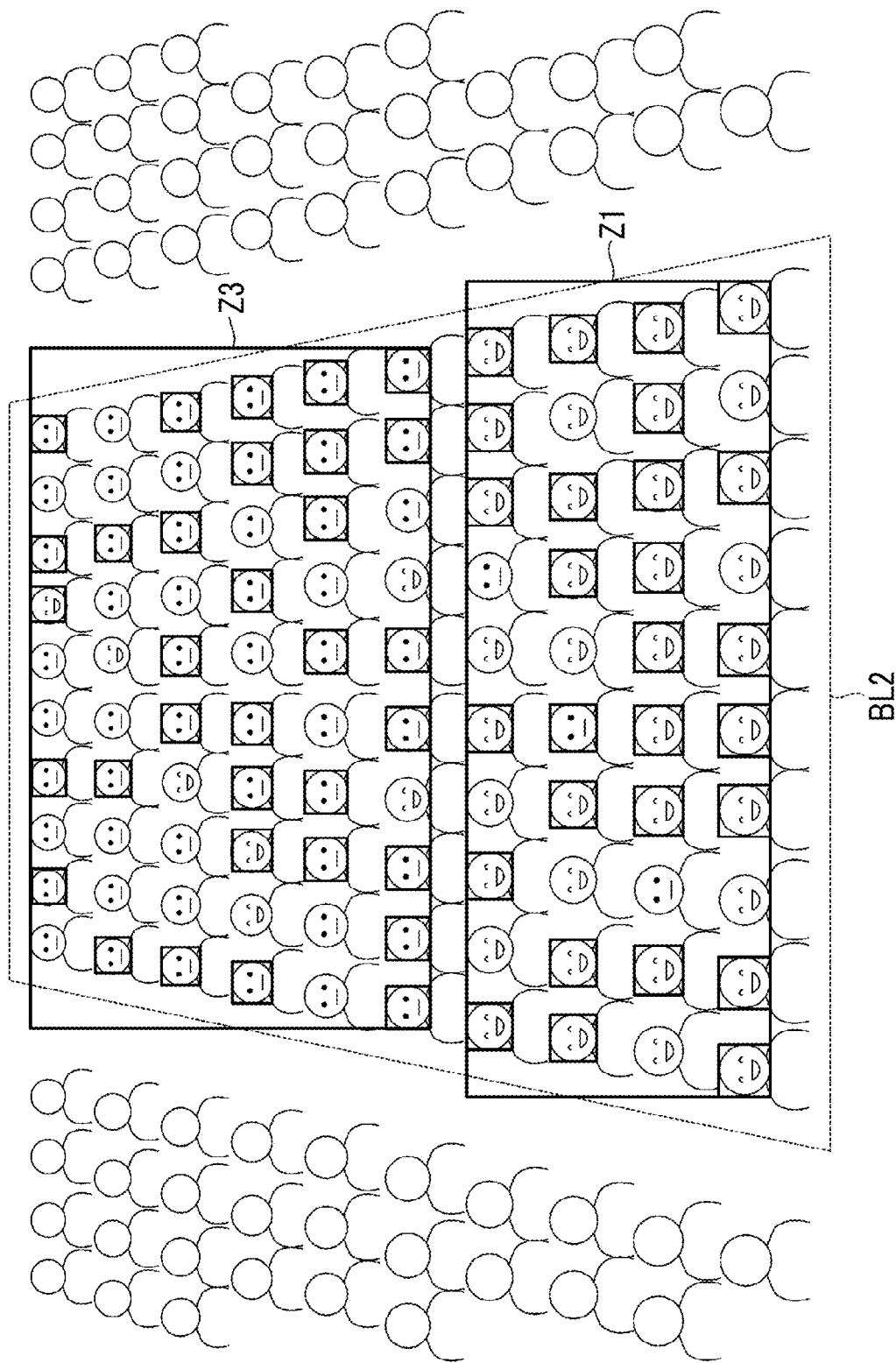
FIG. 22 is a conceptual diagram showing an example of clustering in one block.

FIG. 22 is a conceptual diagram showing an example of clustering in one block. FIG. 22 shows an example of clustering in the second block BL2.

As shown in FIG. 22, clustering is performed on the faces detected in the block. FIG. 22 shows an example of a case where the first discrimination unit discriminates three expressions of "laughing", "angry", and "expressionless" to detect a face. In addition, FIG. 22 shows an example of a case where a discrimination model corresponding to each of the expressions of "laughing", "angry", and "expressionless" is prepared as the second discrimination model. In this case, clustering is performed in three areas corresponding to each of the expressions of "laughing", "angry", and "expressionless". In FIG. 22, an area represented by a reference numeral Z1 is a laughing expression area. An area represented by a reference numeral Z3 is an expressionless area. In the example shown in FIG. 22, since the expression of "angry" has not been detected, the laughing expression area and the expressionless area are clustered.

In this way, the clustering process is executed in the blocks forming the group.

Figure 23:
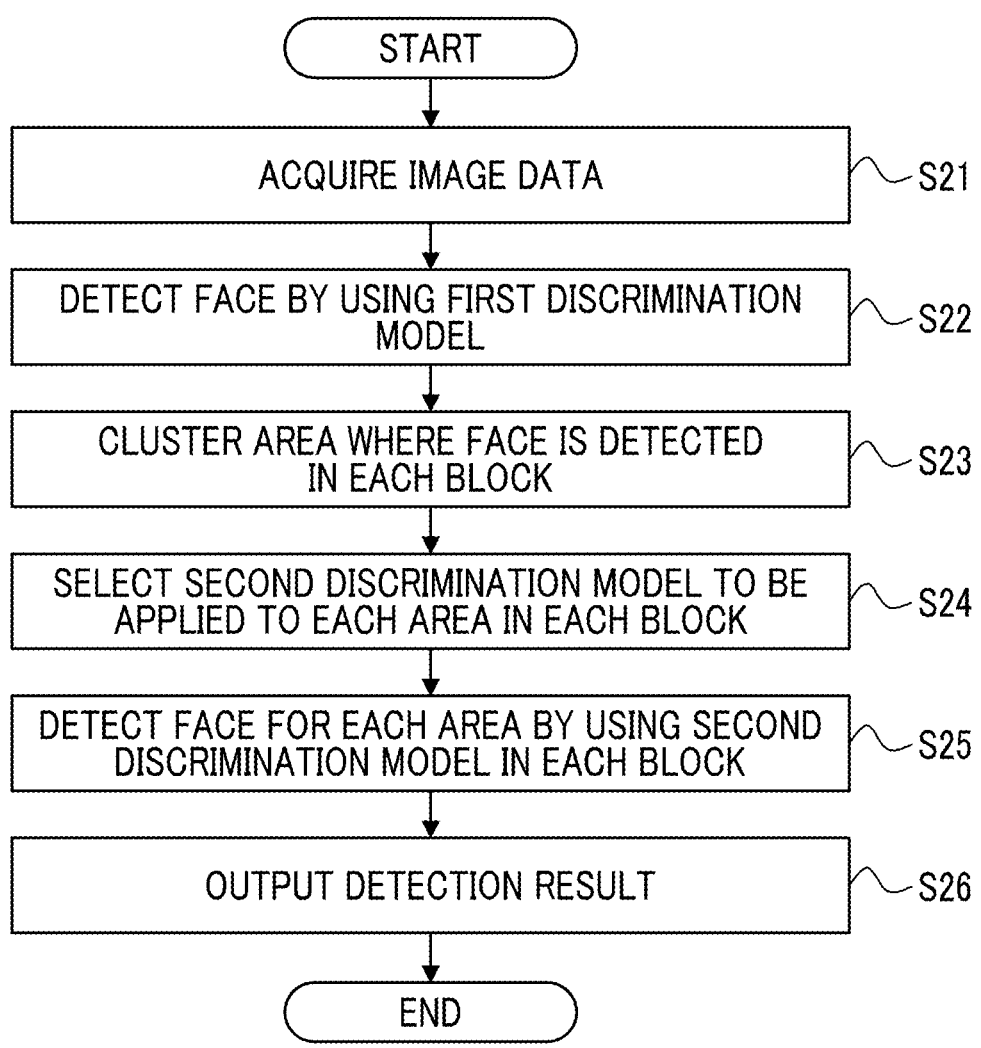
FIG. 23 is a flowchart showing a processing procedure of a detection operation of a face.

FIG. 23 is a flowchart showing a processing procedure of a detection operation of a face.

First, image data to be processed is acquired (Step S21). The image data is input to the image data processing device 10 via the input/output interface 17 or the communication interface 18.

Next, a process of detecting a face by using the first discrimination model is performed on the acquired image data (Step S22). The face is detected from the entire image represented by the image data.

Next, in each block, an area where the face is detected is clustered in the block (Step S23). The clustering is performed according to a type of the second discrimination model. By the clustering, an area of each expression is set for each block. In the present embodiment, a laughing expression area, an angry expression area, and an expressionless area are set for each block.

Next, in each block, a second discrimination model to be applied to each clustered area is selected (Step S24).

Next, in each block, a process of detecting a face from an image of each area is performed using the second discrimination model applied to each area (Step S25). By this process, a face is detected from each area of each block. Information on the face detected from each area in each block is integrated for each block. As a result, the face is detected for each block. The information on the face detected for each block is further integrated and output as a face detection result of the entire image (Step S26).

As described above, in the image data processing device of the present embodiment, the clustering process is performed for each block. That is, the clustering is performed for each group. As a result, the face can be detected more efficiently by using the emotional relevance of the group.

Modification Example

Modification Example 1 for Setting of Processing Target Area

A processing target area in an image may be manually set by the user. For example, a frame may be displayed by being superimposed on an image captured by the imaging device, and a processing target area in the image may be set by the frame. As a result, for example, in a sporting event or the like, in a case where a group of spectators having different support teams is included in the same image, the processing target area can be appropriately divided.

Modification Example 2 for Setting of Processing Target Area

An area where a person exists may be extracted in the image, the extracted area may be set as a processing target area, and the clustering process may be performed for each processing target area. For example, in the example of the above-described embodiment, the area of each of the blocks BL1 to BL6 may be automatically extracted from the captured image and processed.

Figure 24:
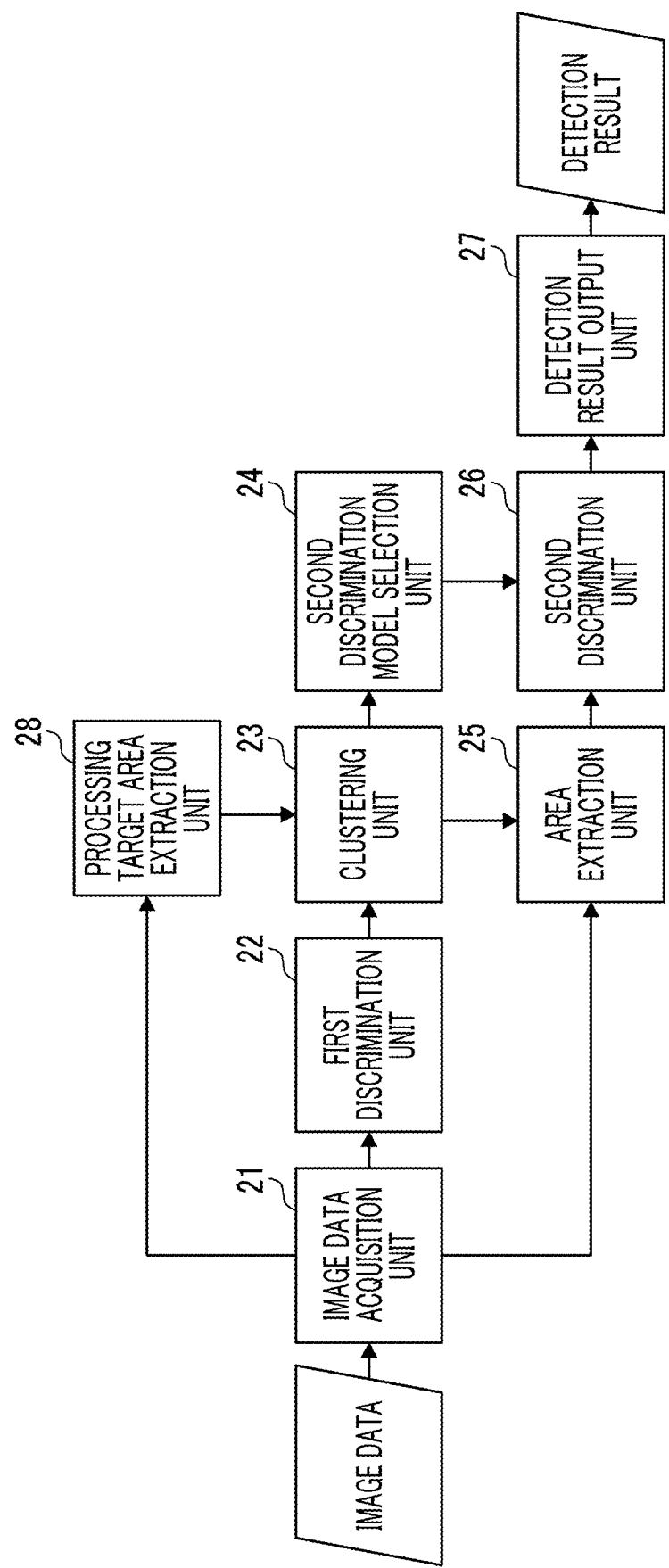
FIG. 24 is a block diagram of a main function of an image data processing device having a function of automatically extracting a processing target area.

FIG. 24 is a block diagram of a main function of an image data processing device having a function of automatically extracting the processing target area.

As shown in FIG. 24, the image data processing device 10 further has a function of a processing target area extraction unit 28.

The processing target area extraction unit 28 processes the image data acquired by the image data acquisition unit 21 and executes a process (extraction process) of automatically extracting an area (processing target area) where a person exists from the image represented by the image data.

FIG. 25 is a conceptual diagram of extraction of the processing target area.

As shown in FIG. 25, the processing target area extraction unit 28 extracts a region forming a straight line (a region indicated by a diagonal line in FIG. 25) from the image, and extracts a region divided by the straight line as the processing target area. That is, the region forming the straight line is a region of the passage 105, and the region divided by the passage 105 is extracted as the processing target area. This process can be executed using a known image recognition technique.

The clustering unit 23 executes the clustering process for each processing target area extracted from the image.

Other Embodiments

In the image data processing device, a hardware structure of a processing unit that executes various processes is realized by various processors. The various processors include a CPU that is a general-purpose processor executing a program to function as various processes and/or a graphic processing unit (GPU), a programmable logic device (PLD) that is a processor of which a circuit configuration can be changed after manufacturing such as a field programmable gate array (FPGA), or a dedicated electric circuit that is a processor having a circuit configuration designed to be dedicated to executing specific processing such as an application specific integrated circuit (ASIC). The program is synonymous with software.

One processing unit may be configured by one of these various processors or may be composed of two or more processors of the same type or different types. For example, one processing unit may be configured by a combination of a plurality of FPGAs or a combination of a CPU and an FPGA. A plurality of processing units may be configured by one processor. As an example in which the plurality of processing units are configured by one processor, first, as represented by a computer used for a client or a server, one processor is configured by a combination of one or more CPUs and software and this processor functions as the plurality of processing units. Second, as represented by a system on chip (SoC) or the like, a processor that realizes the functions of the entire system including the plurality of processing units by using one integrated circuit (IC) chip is used. As described above, the various processing units are configured by using one or more of the above described various processors as a hardware structure.

EXPLANATION OF REFERENCES

10: image data processing device
11: CPU
12: RAM
13: ROM
14: auxiliary storage device
15: operation unit
16: display
17: input/output interface
18: communication interface
21: image data acquisition unit
22: first discrimination unit
23: clustering unit
24: second discrimination model selection unit
25: area extraction unit
26: second discrimination unit
26$a$1: first detection unit
26$a$2: second detection unit
26$a$3: third detection unit
26$b$: detection result integration unit
27: detection result output unit
28: processing target area extraction unit
100: emotion measurement system
101: event venue
102: performer
103: stage
104: seat
105: passage
110: imaging device
120: image data processing device
130: face detection unit
140: map data generation unit
150: heat map generation unit
160: display control unit
170: output control unit
200: databases
BB: bounding box
Im: image
Im1: extracted image
L: label
P: spectator
V: viewing area
BL1 to BL6: block
Z1: clustered laughing expression area
Z2: clustered angry expression area
Z3: clustered expressionless area
S1 to S6: processing procedure of detection operation of face
S11 to S19: processing procedure of detection operation of face
S21 to S26: processing procedure of detection operation of face

What is claimed is:
1. An image data processing device that processes image data, the device comprising:
a memory; and
a processor,
wherein the processor executes
a first discrimination process of detecting a face of a person from an image represented by the image data by using a first discrimination model and discriminating an attribute of the detected face,
a clustering process of clustering an area where the face is detected in the image represented by the image data according to a type of the attribute of the face,
a selection process of selecting a second discrimination model to be applied to the area based on information on the type of the attribute of the face in the clustered area, and
a second discrimination process of detecting a face of a person from an image of the area by using the second discrimination model applied to the area and discriminating an attribute of the detected face.

2. The image data processing device according to claim 1, wherein the second discrimination model is prepared for each type of attributes of a plurality of faces, and
in the clustering process, the clustering is performed according to the type of the attribute of the face for which the second discrimination model is prepared.

3. The image data processing device according to claim 2, wherein the second discrimination model is prepared according to a type of the attribute of the face discriminated by the first discrimination model.

4. The image data processing device according to claim 2, wherein the second discrimination model detects the face of a corresponding type of the attribute with a higher accuracy than the first discrimination model.

5. The image data processing device according to claim 1, wherein the second discrimination model classifies the types in more detail within a range of a corresponding type of the attribute to discriminate the attribute of the face.

6. The image data processing device according to claim 1, wherein the second discrimination model classifies whether or not the face has a corresponding type of the attribute to discriminate the attribute of the face.

7. The image data processing device according to claim 1, wherein the processor executes processes once in order of the first discrimination process, the clustering process, the selection process, and the second discrimination process.

8. The image data processing device according to claim 1, wherein the processor executes processes once in order of the first discrimination process, the clustering process, the selection process, and the second discrimination process, and then repeatedly executes the clustering process, the selection process, and the second discrimination process based on a result of the second discrimination process.

9. The image data processing device according to claim 1, wherein the first discrimination model and the second discrimination model discriminates at least an expression as the attribute of the face.

10. The image data processing device according to claim 9, wherein the first discrimination model and/or the second discrimination model further discriminates an orientation of the face as the attribute of the face.

11. The image data processing device according to claim 1, wherein the processor
further executes an extraction process of extracting an area where a person exists from the image represented by the image data as a processing target area, and
executes the clustering process, the selection process, and the second discrimination process to the extracted processing target area.

12. The image data processing device according to claim 11, wherein, in the extraction process, a passage is detected from the image, and an area divided by the passage is extracted as the processing target area.

13. The image data processing device according to claim 1, wherein the processor further executes a map data generation process of generating map data in which the face detected from the image represented by the image data is recorded by associating a position of the face in the image with the attribute.

14. The image data processing device according to claim 13, wherein the processor further executes a heat map generation process of generating a heat map based on the map data.

15. The image data processing device according to claim 14, wherein the processor further executes a display control process of displaying the generated heat map on a display.

16. The image data processing device according to claim 14, wherein the processor further executes an output control process of outputting the generated heat map to an outside.

17. The image data processing device according to claim 1, wherein the first discrimination model and the second discrimination model are stored in the memory.

18. An image data processing system comprising:
an imaging device; and
the image data processing device according to claim 1, which inputs and processes image data captured by the imaging device.

* * * * *